United States Patent
Hayashi

(10) Patent No.: US 7,362,860 B2
(45) Date of Patent: Apr. 22, 2008

(54) IMAGE DATA ENCRYPTION METHOD, IMAGE DATA TRANSFORM METHOD, APPARATUS FOR THE METHODS, COMPUTER PROGRAM, AND COMPUTER-READABLE STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 766 days.

(21) Appl. No.: 10/789,986

(22) Filed: Mar. 2, 2004

(65) Prior Publication Data

US 2004/0177251 A1    Sep. 9, 2004

(30) Foreign Application Priority Data

Mar. 7, 2003  (JP) ............................. 2003-061863

(51) Int. Cl.
    *H04N 7/167*    (2006.01)
(52) U.S. Cl. ................. 380/210; 380/54; 380/287; 283/17; 283/73; 713/161; 382/232
(58) Field of Classification Search ............... 713/176; 382/100; 380/210, 54, 287; 283/17, 73
    See application file for complete search history.

(56) References Cited

U.S. PATENT DOCUMENTS

| | | | |
|---|---|---|---|
| 6,061,451 A * | 5/2000 | Muratani et al. ........... 380/201 |
| 6,101,314 A * | 8/2000 | Keesen ....................... 386/124 |
| 6,134,269 A * | 10/2000 | Puri et al. .............. 375/240.03 |
| 6,535,616 B1 | 3/2003 | Hayashi et al. |
| 6,677,868 B2 * | 1/2004 | Kerofsky et al. .......... 341/107 |
| 6,931,534 B1 * | 8/2005 | Jandel et al. ............... 713/176 |
| 2001/0055390 A1 | 12/2001 | Hayashi et al. |
| 2002/0172398 A1 | 11/2002 | Hayashi |
| 2002/0199106 A1 | 12/2002 | Hayashi |
| 2003/0059086 A1 | 3/2003 | Hayashi |
| 2003/0128863 A1 | 7/2003 | Hayashi |
| 2003/0202680 A1 | 10/2003 | Hayashi |
| 2003/0204812 A1 | 10/2003 | Hayashi |
| 2003/0210803 A1 | 11/2003 | Kaneda et al. |
| 2004/0003261 A1 | 1/2004 | Hayashi |
| 2006/0004583 A1 * | 1/2006 | Herre et al. ................. 704/500 |

* cited by examiner

*Primary Examiner*—Kim Vu
*Assistant Examiner*—April Shan
(74) *Attorney, Agent, or Firm*—Fitzpatrick, Cella, Harper & Scinto

(57) ABSTRACT

This invention allows the encryption side to set whether an image playback apparatus should play back image data in a scrambled state or a non-scrambled state. When a code-block of input image data is an object to be encrypted, it is encrypted. In playing back the data, it is determined whether playback is to be executed by using the encrypted code-block (the scrambling playback mode is to be set). To inhibit use of the encrypted code-block, a terminating marker is placed at the start of the code-block. To use the encrypted code-block, the terminating marker is placed at the end of the code-block.

14 Claims, 22 Drawing Sheets

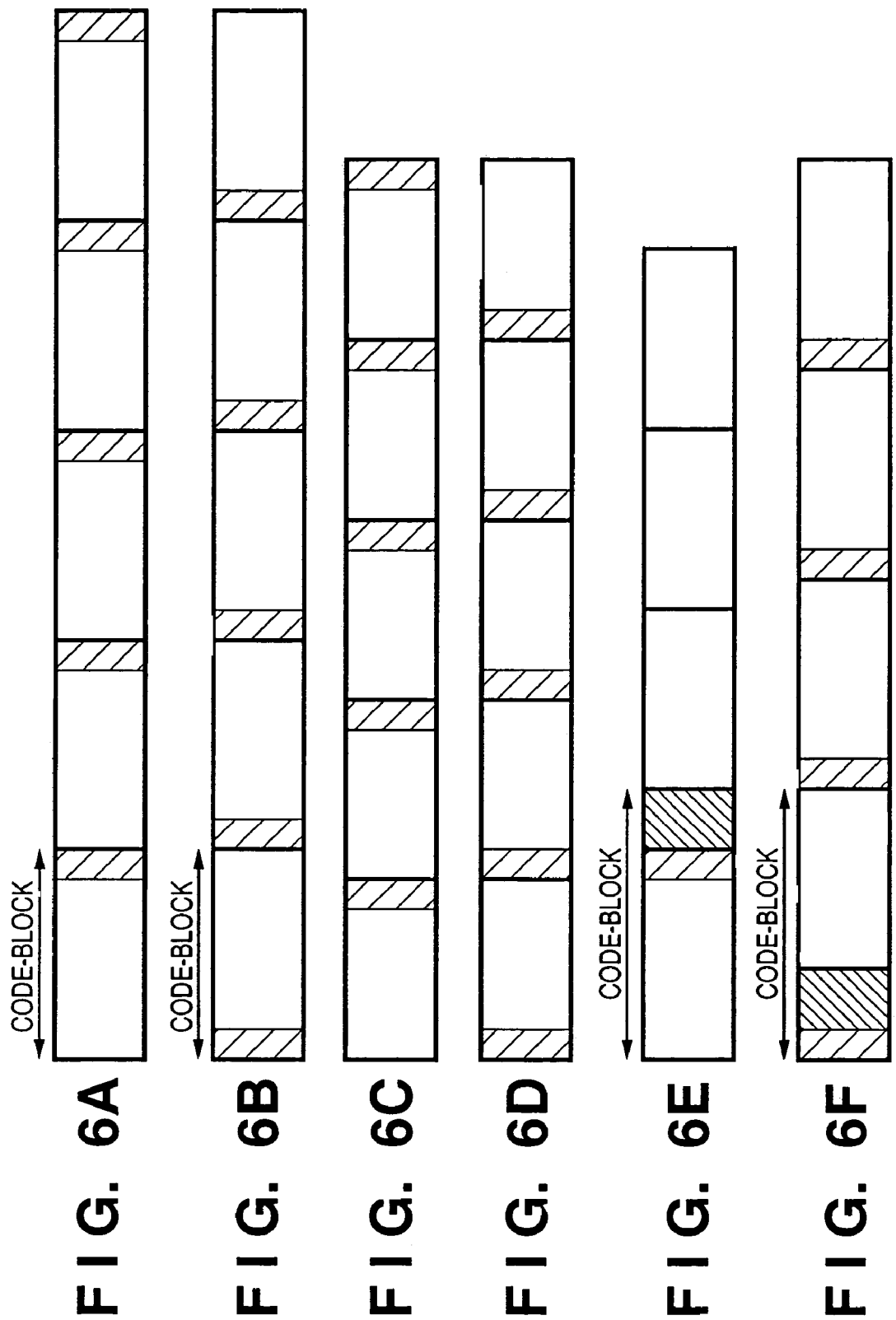

LL,{LH2+HH2+HL2} : UNENCRYPTED
{LH3+HH3+HL3} : ENCRYPTED

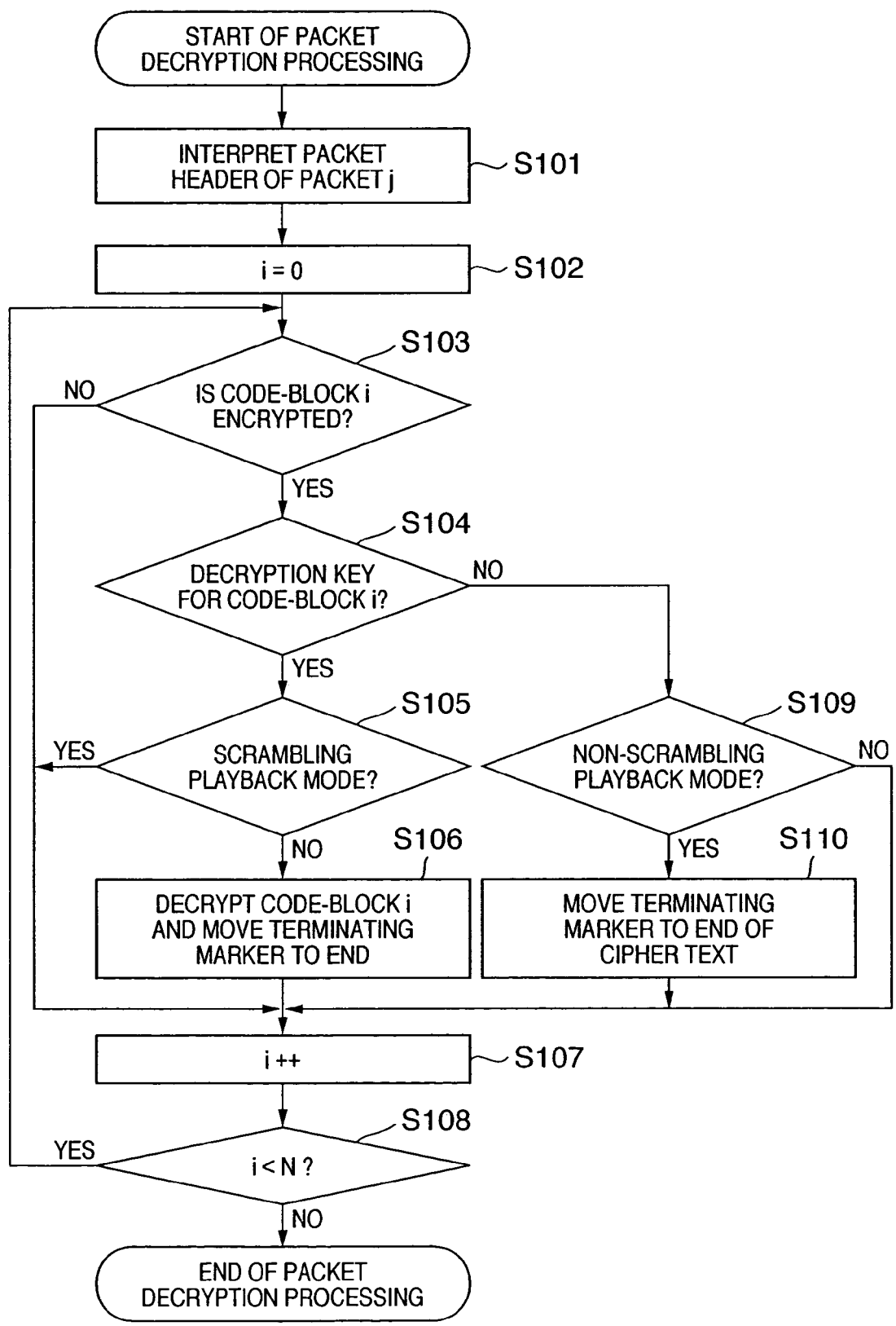

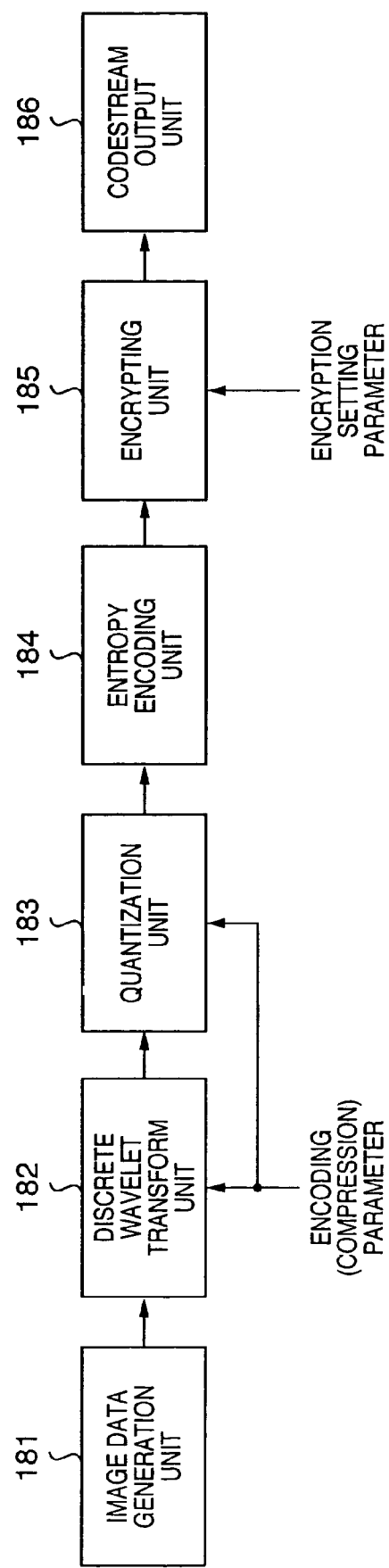

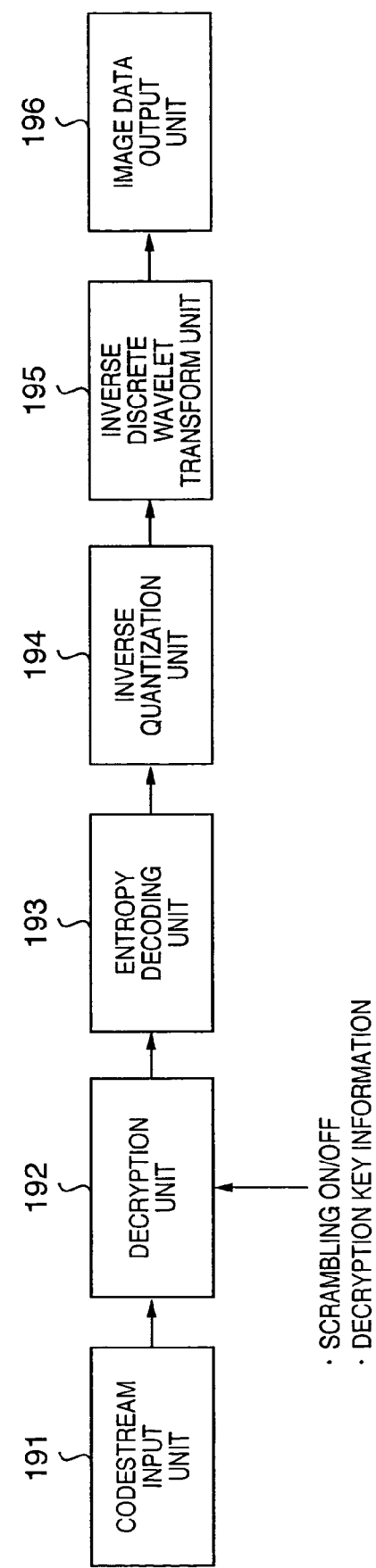

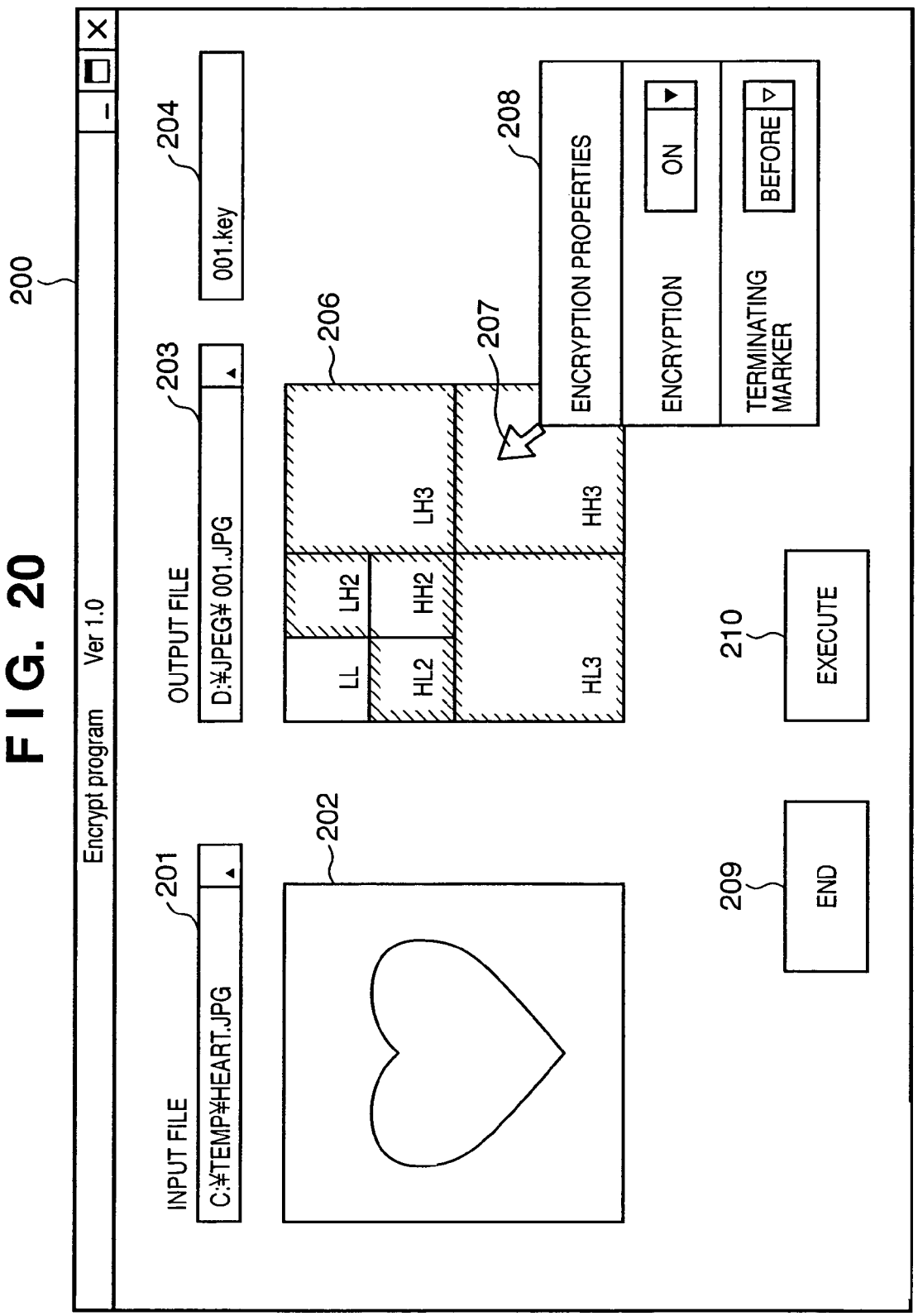

IMAGE DATA ENCRYPTION METHOD, IMAGE DATA TRANSFORM METHOD, APPARATUS FOR THE METHODS, COMPUTER PROGRAM, AND COMPUTER-READABLE STORAGE MEDIUM

FIELD OF THE INVENTION

The present invention relates to an image data encryption/decryption technique.

BACKGROUND OF THE INVENTION

To control access to image data, a technique for encrypting or scrambling image data is used. With this technique, image data is encrypted in advance by using an encryption key, and only persons who have a decryption key corresponding to the encryption key can correctly play back the image data.

Image data has an enormous information amount. To efficiently transmit and store such image data, it is often encoded (compressed). To encode (compress) image data, for example, a technique called JPEG2000 standard which is standardized by ISO/IEC JTC 1/SC 29/WG1 is used. The above-described image data encryption is sometimes executed for image data which is encoded (compressed) by the JPEG2000 standard. With this processing, image data can efficiently be transmitted and stored. In addition, access to the image data can be controlled.

Especially, according to the encoding (compression) technique such as the JPEG2000 standard, image data can be hierarchically encoded (compressed) in accordance with the resolution, image quality, spatial domain, and components which construct pixels. When image data having a hierarchical structure is subjected to encryption processing corresponding to such hierarchical structure, access control corresponding to the hierarchical structure can be implemented.

For access control depending on, for example, resolution, low-resolution components are not encrypted, and only high-resolution components are encrypted. In this case, access control can be executed such that everybody can play back the low-resolution components, and only authorized users (decryption key holders) can correctly play back the high-resolution components.

However, when image data having a hierarchical structure undergoes encryption processing corresponding to the hierarchical structure, an apparatus having no decryption key cannot execute decryption. Since the image data is decrypted in the encrypted state, the image is played back in a scrambled state. That is, it is difficult to play back an image in a non-scrambled state by an apparatus having no decryption key (for example, when access control is executed depending on resolution, as described above, it is difficult to play back only low-resolution image data without playing back high-resolution image data).

SUMMARY OF THE INVENTION

The present invention has been made in consideration of the above problem, and has as its object to provide a technique which allows the encryption side to set whether an image playback apparatus should play back image data in a scrambled state or a non-scrambled state.

In order to achieve the above object, for example, an image data encryption method according to the present invention comprises the following steps.

An image data encryption method of encrypting image data, comprising:

a step of inputting image data, which is constituted by a plurality of data blocks, for each data block;

a determination step of determining whether the input data block is an object to be encrypted;

an encryption step of encrypting the data block when it is determined in the determination step that the data block as the object to be encrypted is input;

an addition step of adding terminating information to specify a terminating position of significant data for decoding to a start position of the data block encrypted in the encryption step;

a switching step of switching whether the addition step should be executed; and an output step of outputting a data block which is determined in the determination step as a data block not to be encrypted and a data block generated via the switching step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A to 6F are views showing the data formats of code-blocks after encryption according to the embodiment;

FIG. 10B is a flow chart showing details of other processing procedures of packet decryption processing in FIG. 9;

FIG. 18 is a block diagram of an image encoding (compressing) apparatus according to the third embodiment;

FIG. 19 is a block diagram of a decoding (decompression) and decryption apparatus according to the third embodiment;

FIG. 20 is a view showing an example of a setting window serving as a user interface in encryption processing according to the embodiment.

DETAILED DESCRIPTION OF THE PREFERRED EMBODIMENTS

The embodiments of the present invention will be described below with reference to the accompanying drawings.

<Description of Overall Arrangement>

Figure 14:
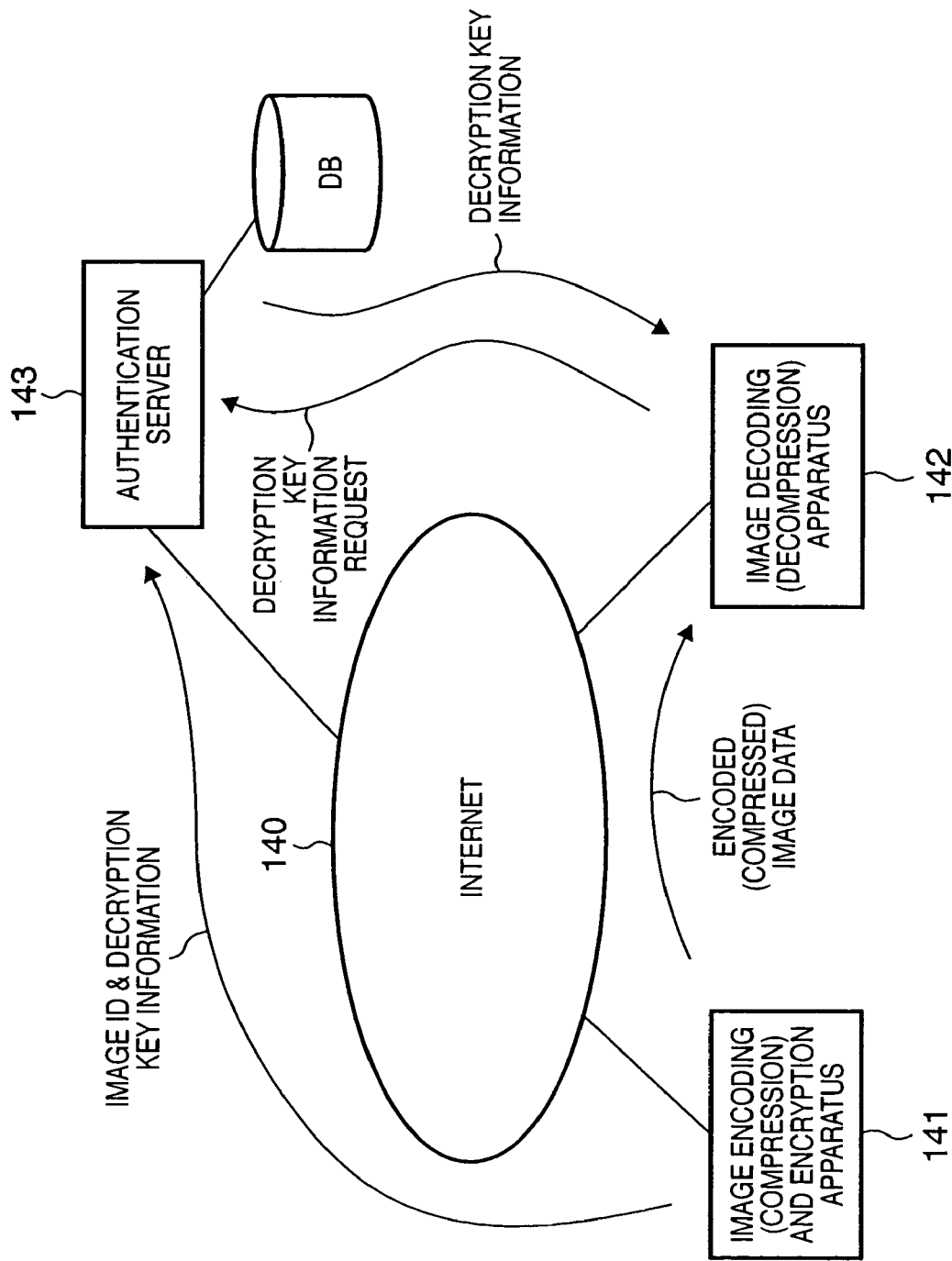
FIG. 14 is a view showing the overall arrangement of the system according to the embodiment.

FIG. 14 shows the schematic arrangement of a system according to an embodiment. Referring to FIG. 14, reference numeral 140 denotes Internet. An image encoding (compression) and encryption apparatus 141 encodes (compresses) and encrypts image data sensed by, for example, a digital camera, image scanner, or film scanner. An image decoding (decompression) and decryption apparatus 142 receives image data and decodes (decompresses) and decrypts it. An authentication server 143 stores a decryption key which is necessary for decoding (decompression) and decryption. Each of the apparatuses 141 to 143 can be a general-purpose apparatus such as a personal computer. The flow of processing will briefly be described below.

The apparatus 141 executes encoding (compression) and encryption processing for desired image data and distributes it through the Internet 140. The distribution may be done either directly by the apparatus 141 or through an appropriate server. Since the image data is encrypted, key information which is necessary for decrypting the image data is registered in advance in a DB in the authentication server 143 together with information (e.g., an ID) which specifies the image data. The image decoding (decompression) and decryption apparatus 142 receives a desired image, decodes (decompresses) and decrypts the image data, and browses it. To browse encrypted image data, the apparatus 142 sends information which specifies the image to the authentication server 143 and requests decryption key information. As a result, the decryption key information is received from the authentication server 143. The apparatus 142 decrypts and decodes (decompresses) the image data by using the decryption key information.

In the embodiment, for the descriptive convenience, an image (file) to be encrypted is assumed to be data encoded (compressed) by an encoding (compression) method which is standardized by ISO/IEC JTC 1/SC 29/WG1 15444-1 and popularly called JPEG2000. However, the present invention is not limited to JPEG2000, and various encoding (compression) methods such as JPEG can be used, as will be apparent from the following description.

Before description of details of encryption processing in the apparatus 141, the operation window of encryption processing according to this embodiment will be described with reference to FIG. 20.

Referring to FIG. 20, reference numeral 200 denotes a window. A field 201 designates a file to be encrypted (a file encoded (compressed) by JPEG2000). The file may be either designated by a file path input from a keyboard (not shown) or selected in a file browser which is displayed by clicking the button at the right end of the field 201. In a region 202, an image indicated by the selected file (an image to be decoded (decompressed) and decrypted) is displayed.

The window 200 has, at its right portion, a field 203 in which an output file name after encryption is input, and a field in which a file name 204 (only a file name because a decryption key file is stored in the same path as that of the output file) of a decryption key which decrypts an encrypted image.

Figure 21:
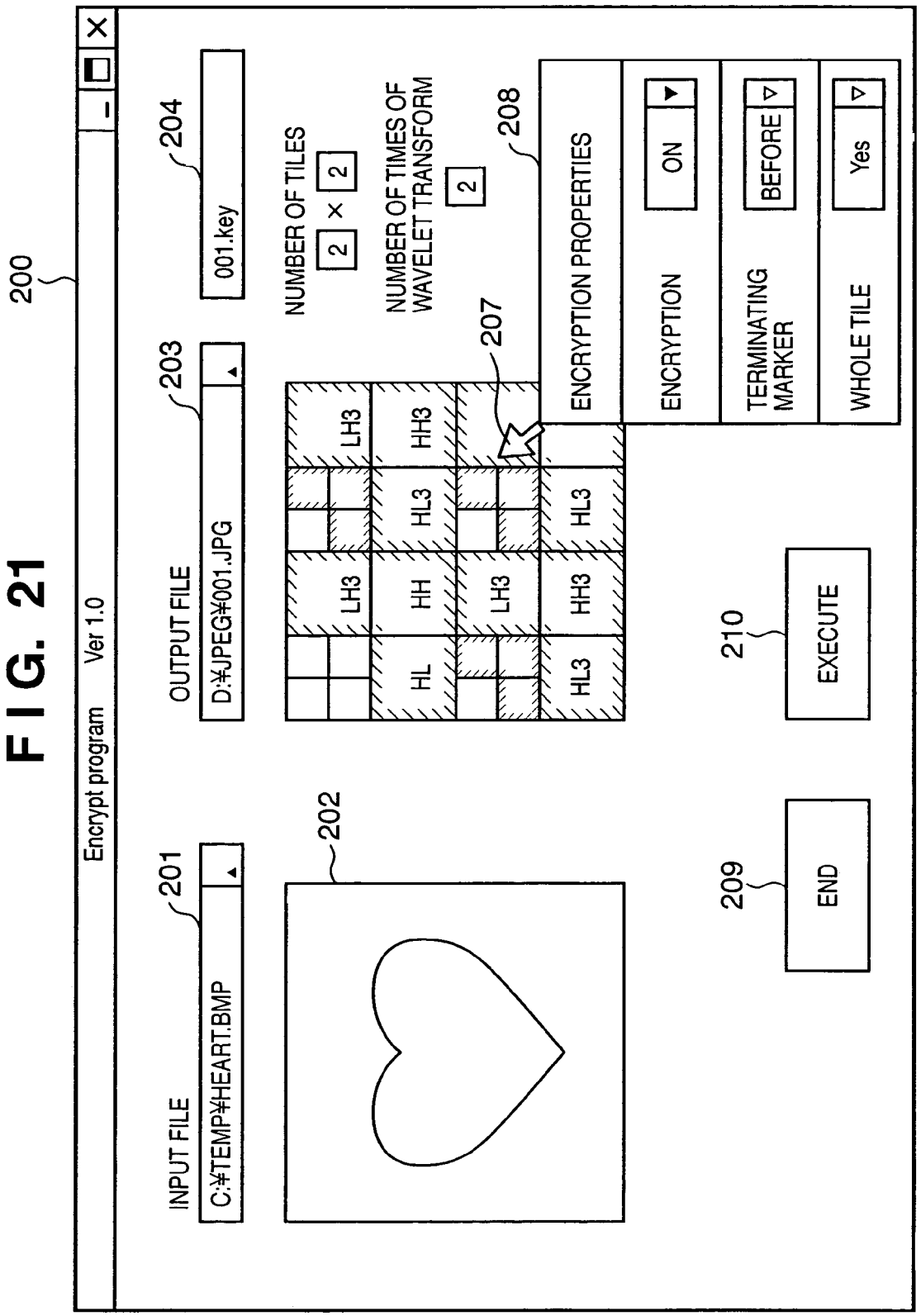
FIG. 21 is a view showing an example of a setting window serving as a user interface in encryption processing according to the third embodiment.

For a file whose image to be input is encoded (compressed) by JPEG2000, the number of times of wavelet encoding executed is determined in advance and can be known by interpreting the header field. Reference numeral 206 indicates a portion where frequency components are represented by tile-parts based on the number of times of wavelet transform of the file. In the example shown in FIG. 20, the number of times of wavelet transform is two. Hence, the tile-parts are divided into three resolution level groups, LL, {LH2+HH2+HL2}, and {LH3+HH3+HL3}. A cursor 207 is displayed in synchronism with a pointing device such as a mouse (registered trademark). The user moves the cursor 207 onto a desired tile-part and clicks the button of the pointing device at that position. Then, an encryption processing setting window for that tile-part is displayed. Reference numeral 208 in FIG. 20 denotes a setting window. As shown in FIG. 21, the user can set, for each tile-part, whether encryption is to be executed and whether the terminating marker is to be placed before or after (details will be described later). Since each of these items is selected two choices, a combo box is used. However, a radio button may be used. That is, the present invention is not limited by the display format.

In JPEG2000, one image may be segmented into a plurality of tiles. When a plurality of tiles are present, display is done in accordance with the number of tiles.

A button 209 is clicked on to end the processing. A button 210 is clicked on to start executing encryption processing.

When the button 210 is clicked on, the set contents (information about a sub-band to be encrypted and information representing the layout position of a terminating marker in the encoded (compressed) data of the sub-band) are temporarily stored in a RAM (as described above, the apparatus 141 is a general-purpose information processing apparatus such as a personal computer and therefore includes a working RAM). The designated original image file is loaded and encrypted in accordance with the set contents. The result of encryption is output as a file described in the field 203.

In the above example, tile-parts are divided into groups of resolutions. Instead, encryption may be designated for each sub-band, for example, only the sub-band LH3 or set for a plurality of tile-parts.

In FIG. 20, the target of wavelet transform is an entire image, that is, 1 tile=1 image. However, a plurality of tiles may be present, as described above. In this case, information which specifies each tile must be stored as the set contents. Whether encryption should be executed may be set for each tile.

<Encryption Processing Unit>

Figure 1:
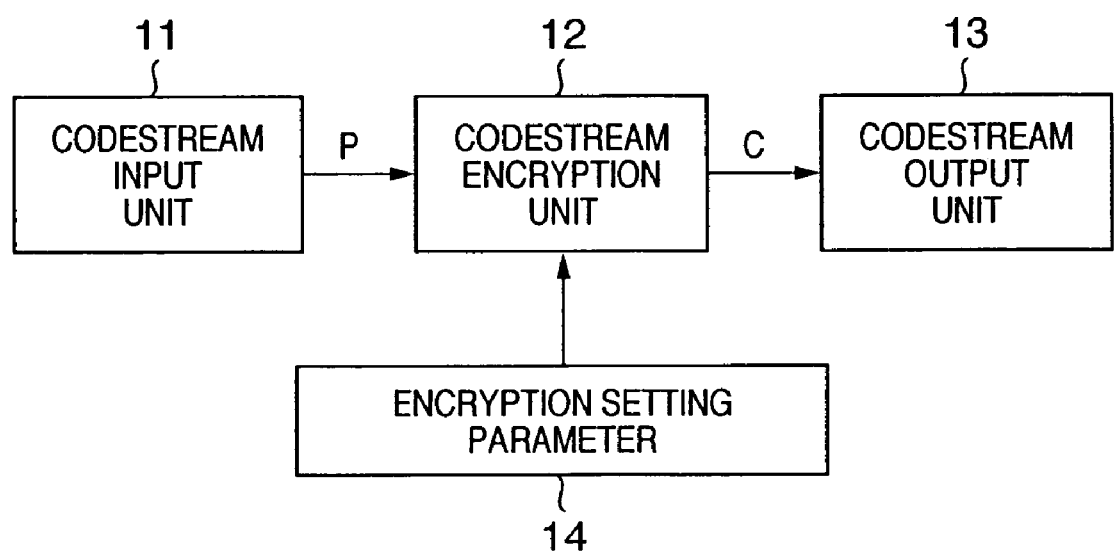
FIG. 1 is a block diagram showing the arrangement of an encryption processing unit according to an embodiment.

FIG. 1 is a block diagram for explaining the encryption processing function according to the embodiment. FIG. 1 corresponds to part of processing in the apparatus 141 shown in FIG. 14 and can simply be regarded as a processing function block diagram when the button 210 shown in FIG. 20 is clicked on. When the processing object has a data format other than JPEG2000, encoding (compression) by JPEG2000 is executed first. This processing will be described later in detail. The following description will be done assuming that encoding (compression) by the JPEG2000 has already been done.

Referring to FIG. 1, reference numeral 11 denotes a codestream input unit; 12, a codestream encryption unit; 13, a codestream output unit; and 14, an encryption parameter unit which holds contents set in the window shown in FIG. 20.

The codestream input unit 11 inputs an image file designated by the user as a codestream and interprets a header contained in the codestream to extract parameters necessary for subsequent processing. The codestream input unit 11 controls the flow of processing or sends a necessary parameter to the following processing unit, as needed. An input codestream P is output to the codestream encryption unit 12. A codestream output from an encoding (compression) processing unit (to be described later) is input to the codestream input unit 11.

The codestream encryption unit 12 receives the codestream P, encrypts a portion designated by a set parameter from the encryption parameter unit 14, and outputs an encrypted codestream C. The codestream encryption processing executed by the codestream encryption unit 12 will be described later in detail. The encrypted codestream C is output from the codestream output unit 13 to an external storage device (e.g., a hard disk) as the encrypted file designated by the user.

The codestream output unit 13 receives the codestream C, which is encrypted by the codestream encryption unit 12 on the input side, and outputs the encrypted codestream C. Decryption key information is separately created and output.

Figure 2:
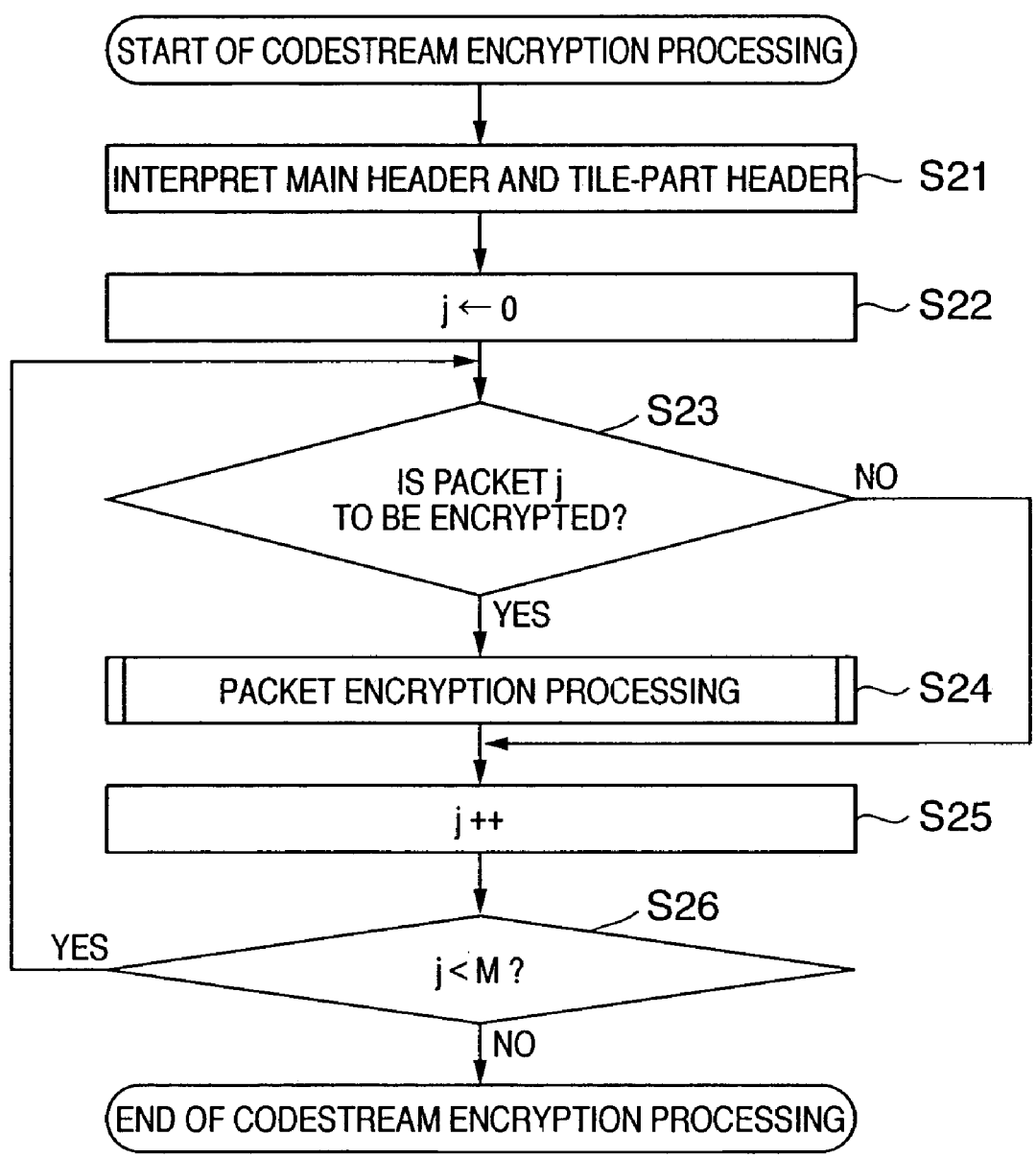
FIG. 2 is a flow chart showing the processing procedures of a codestream encryption unit in FIG. 1.

The codestream encryption processing executed by the codestream encryption unit 12 will be described next with reference to FIG. 2. FIG. 2 is a flow chart for explaining the codestream encryption processing according to this embodiment.

A codestream according to this embodiment is a data sequence encoded (compressed) by the encoding (compression) method which is standardized by ISO/IEC JTC 1/SC 29/WG1 15444-1 and popularly called JPEG2000, as described above. Hence, the codestream input unit 11 inputs the encoded (compressed) data sequence.

First, in step S21, the main header and tile-part header of the input codestream P are interpreted. The structure of the codestream P which can be adapted in this embodiment will be described here with reference to FIGS. 3A to 3C.

In the JPEG2000 encoding (compression), the image is segmented into a plurality of rectangular regions. The rectangular regions are independently encoded (compressed) by wavelet transform. Each rectangular region is called a "tile". In the JPEG2000, a codestream corresponding to an encoded (compressed) tile can be divided into one or more regions called tile-parts. In the JPEG2000, encoding (compression) processing can also be executed independently for each tile.

Figure 3A:
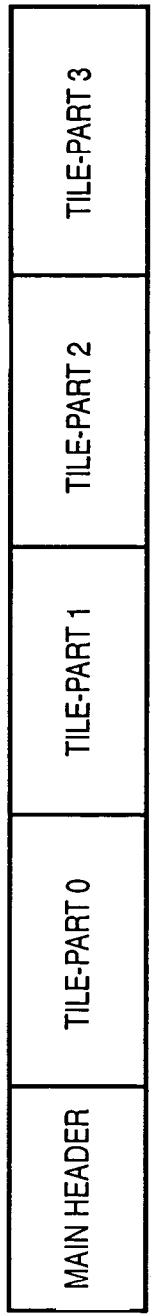
FIGS. 3A to 3C are views showing the data format of a codestream according to the embodiment.

FIG. 3A shows an example of a codestream obtained when an entire image is segmented into four tiles and encoded (compressed). In this case, as shown in FIG. 3A, the codestream P is constituted by four tile-parts following one main header.

The main header contains pieces of component information, which represent the size (the number of pixels in the horizontal and vertical directions) of the image to be encoded (compressed), the tile size, the number of components expressing each color component, the size of each component, and bit accuracy.

Figure 3B:
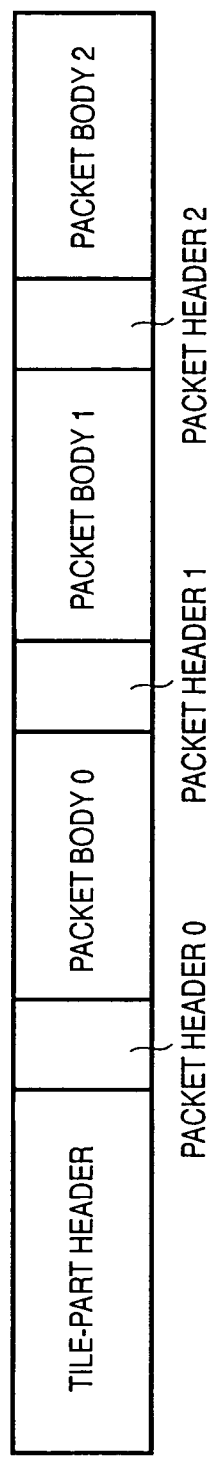

A tile-part according to this embodiment will be described next. FIG. 3B shows the structure of a codestream which constitutes one tile-part. As shown in FIG. 3B, the tile-part is constituted by one or more units called packets following one tile-part header.

A transmission unit used in the communication field also uses expression "packet". In this embodiment, however, a packet is not a packet of communication level (protocol layer). Instead, a packet indicates a data block of application level.

The tile-part header is constituted by a tile length containing both the bitstream length and header length of the tile-part, and encoding (compression) parameters for the tile. The encoding (compression) parameters include the level of discrete wavelet transform (how many times wavelet transform has been executed) and the type of filter (designation of the number of taps).

Figure 3C:
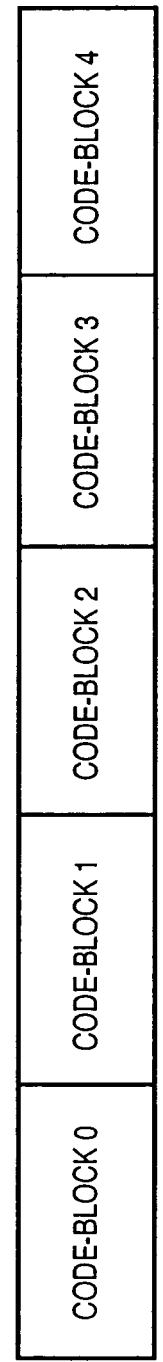

A packet according to this embodiment will be described next. A packet is an encoding (compression) unit which is specified by a predetermined resolution level, predetermined layer, predetermined precinct, and predetermined component. A packet is constituted by a packet body made of entropy encoding corresponding to the packet, and a packet header which records encoding parameters related to the packet body. As shown in FIG. 3C, a packet is constituted by one or more units called code-blocks. The resolution level, layer, precinct, component, and code-block will be described later in detail. When the packet header is interpreted, the resolution level (corresponding to the frequency component group shown in FIG. 20), layer, precinct, and component to which the packet belongs can be discriminated. In short, whether the packet of interest is an object to be encrypted can be discriminated.

The structure of the codestream P which can be adapted in this embodiment has been described above.

Referring back to the flow chart shown in FIG. 2, a parameter j is initialized to zero in step S22. The parameter j specifies a packet. In step S23, it is determined in accordance with information from the encryption parameter unit 14 whether the specified packet j is an object to be encrypted. If YES in step S23, the processing advances to step S24. If NO in step S23, the processing advances to step S25.

How to set the object to be encrypted has been described above with reference to FIG. 20. For example, the encryption parameter may be stored as a separate file and used.

In either case, for access control that "allows everybody to browse a low-resolution image and only authorized users to browse a high-resolution image", only packets corresponding to high resolution level are set as objects to be encrypted, and packets corresponding to low resolution level are set not to be encrypted. For access control that "allows everybody to browse a region A and only authorized users to browse a region B" (when a plurality of tiles are present, or when only specific sub-bands are to be encrypted), only packets corresponding to the region B are set as objects to be encrypted, and packets corresponding to the region A are set not to be encrypted.

When all packets contained in the codestream are known in advance as objects to be encrypted, the determination processing in step S23 can be omitted. Even when code-blocks as objects to be encrypted are to be determined in packet encryption processing (to be described later), the determination processing in step S23 can be omitted.

In step S24, packet encryption processing is executed for the packet j. The packet encryption processing will be described later in detail. In step S25, the value of the parameter j is incremented by one. In step S26, the parameter J is compared to a value M. M is the total number of packets contained in the codestream. When j<M, the processing returns to step S23. When j≧M, the codestream encryption processing is ended.

The codestream encryption processing according to this embodiment has been described above.

Packet encryption processing according to this embodiment will be described next in detail with reference to FIG. 4. That is, this processing is executed when it is determined that the packet is an object to be encrypted.

In step S41, the packet header of the input packet j is interpreted to interpret the structure of code-blocks contained in the packet. In step S42, a parameter i is initialized to zero. The parameter i specifies a code-block. In step S43, it is determined whether the specified code-block i is an object to be encrypted. If YES in step S43, the processing advances to step S44. If NO in step S43, the processing advances to step S48.

When all code-blocks contained in the packet are known in advance as objects to be encrypted in step S23 in FIG. 2 described above, the determination processing in step S43 can be omitted.

In step S44, the code-block i is encrypted. In this embodiment, the encryption algorithm is not particularly limited. Various encryption algorithms including a secret key cryptosystem such as DES (Data Encryption Standard) or AES (Advanced Encryption Standard) and a public key cryptosystem such as RSA can be applied. Information which specifies the applied encryption algorithm is recorded in the main header, tile-part header, or packet header and transmitted to the decryption processing unit (to be described later). The information may be transmitted as part of additional information added after the terminating marker (to be described later). The information may be shared in advance by the decryption processing unit and decoding (decompression) processing unit in advance.

In step S45, it is selected whether the code-block to be encrypted is set in a scrambling playback mode or a non-scrambling playback mode. If YES in step S45, the processing advances to step S46. If NO in step S45, the processing advances to step S47.

The scrambling playback mode and non-scrambling playback mode will be described here.

Generally, when image data having a hierarchical structure such as JPEG2000 is to be played back, decoding (decompression) processing is executed from encoded data having a low resolution to encoded data having a high resolution. Hence, in encoded (compressed) data of JPEG2000 using wavelet transform, LL is decoded (decompressed) first. An image having a higher resolution is played back by using the decoding (decompression) result of LL and the encoded (compressed) data of {LH2+HH2+HL2}. An image having a further higher resolution is played back by using the decoding (decompression) result of {LH2+HH2+HL2} and the encoded (compressed) data of {LH3+HH3+HL3}. A final decoding (decompression) result is thus obtained.

Assume that the encoded (compressed) data of {LH3+HH3+HL3} is encrypted. If there is no decryption key information, images up to {LH2+HH2+HL2} can be played back as normal images. However, when subsequent {LH3+HH3+HL3} is used, an image on which insignificant noise is superposed is played back. In this embodiment, this playback mode is called a scrambling playback mode.

When the data of LL and {LH2+HH2+HL2} are not encrypted, and the encoded (compressed) data of {LH3+HH3+HL3} is encrypted, decoding (decompression) processing is stopped after decoding (decompression) processing based on the encoded (compressed) data of {LH2+HH2+HL2}. In this embodiment, this playback mode is called a non-scrambling playback mode.

The scrambling playback mode and non-scrambling playback mode will be described with reference to FIGS. 7A to 7D.

Figure 7A:
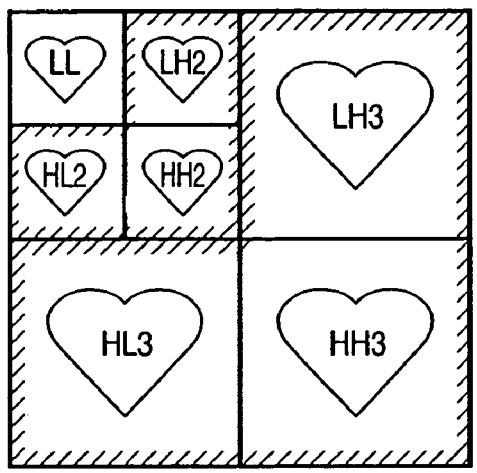
FIGS. 7A to 7D are views showing the correspondence between encryption processing and playback examples according to the embodiment.

FIG. 7A is a view showing the wavelet transform region of a codestream having three resolution levels (when wavelet transform is performed twice). In this example, packets corresponding to {LH3+HH3+HL3} as the highest resolution level are encrypted, and the remaining resolution levels are not encrypted.

Figure 7B:
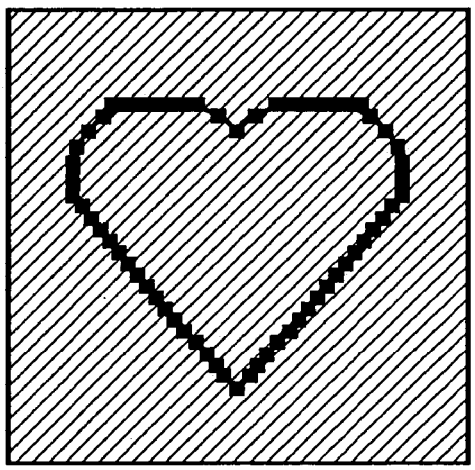
Figure 7C:
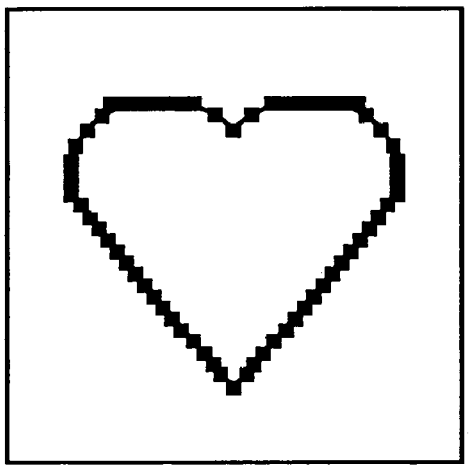
Figure 7D:
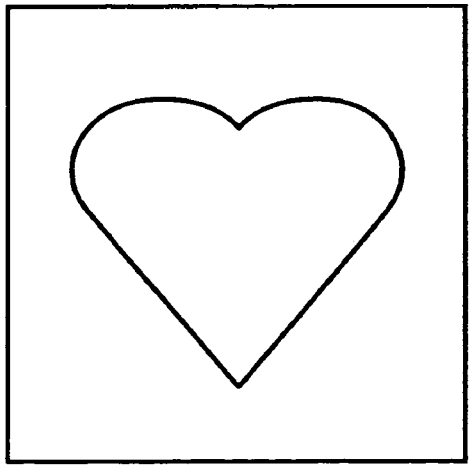

FIG. 7B shows an image played back by normal decoding (decompression) processing. Since the decoded (decompressed) data of {LH3+HH3+HL3}, which is encrypted, is used, the image is scrambled. FIG. 7C shows an example in which the non-scrambling playback mode is applied so that decoding (decompression) processing is stopped before decoding (decompression) of the encrypted data of {LH3+HH3+HL3} as the highest resolution. Since the image shown in FIG. 7C does not have the highest resolution, some jaggies are generated. However, an image which is more significant than at least that shown in FIG. 7A can be played back. When decryption key information is acquired, {LH3+HH3+HL3} can be decrypted, and decoding (decompression) processing can be continued. In this case, an image shown in FIG. 7D can be obtained.

As described above, when the processing is executed in the scrambling playback mode, an encrypted resolution level is decoded (decompressed) in an encrypted state. That is, as shown in FIG. 7B, resolution levels (resolution levels which are not encrypted) other than the highest resolution level are normally played back. However, the highest resolution level (encrypted resolution level) is played back as noise. As a result, the entire image looks as if it were in a so-called scrambled state.

On the other hand, when the processing is executed in the non-scrambling playback mode, no encrypted resolution level is decoded (decompressed) at all. That is, as shown in FIG. 7C, all resolution levels up to the highest one ({LH2+HH2+HL2} in FIG. 7A) of unencrypted resolution levels are normally played back. No higher resolution levels are played back. As a result, although the entire image looks as an image having a lower resolution than the original image, it can be played back without any sense of incompatibility.

Figure 4:
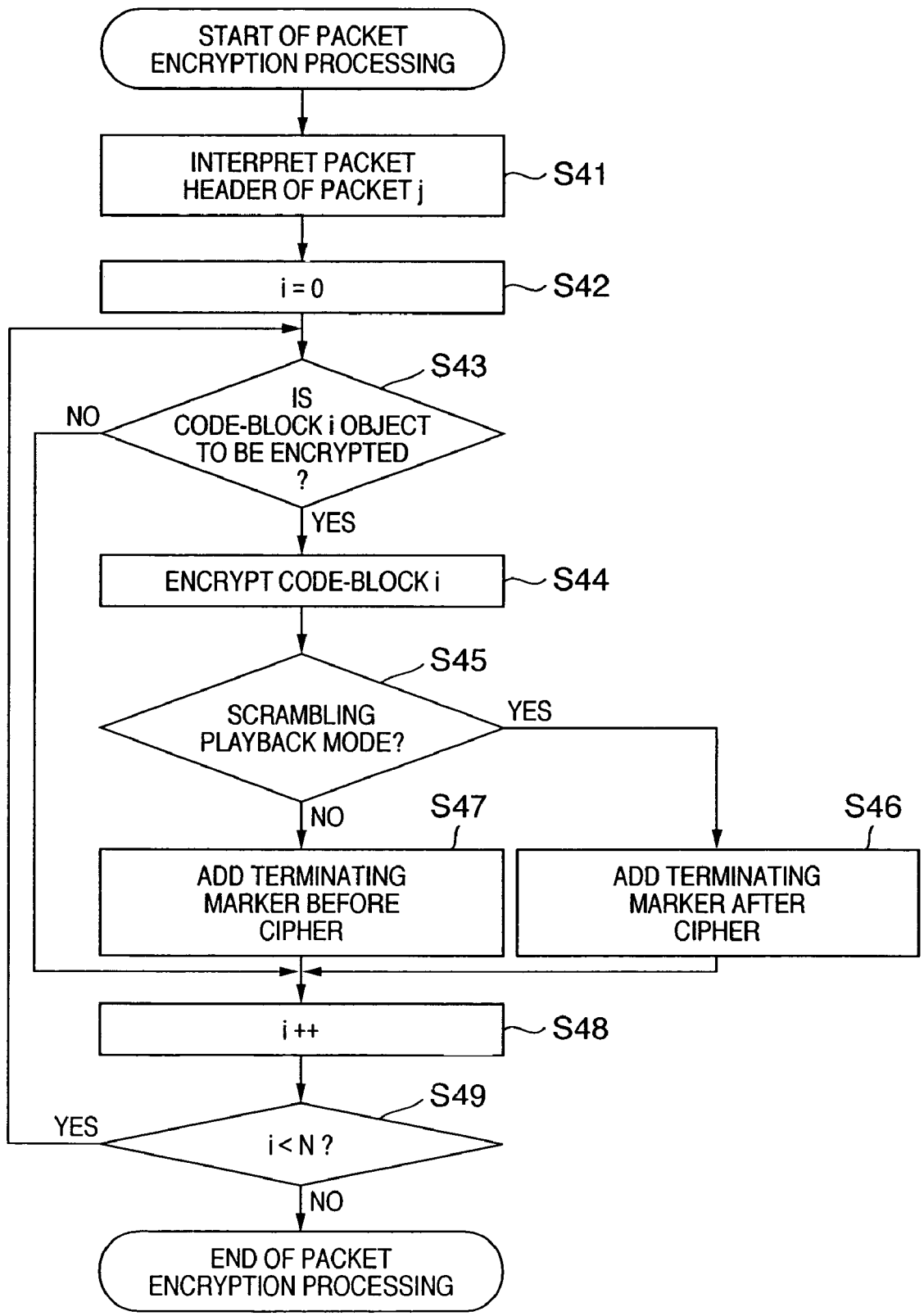
FIG. 4 is a flow chart showing details of packet encryption processing in FIG. 2.

Processing for playback control of resolution levels is executed in the determination in step S45 in FIG. 4.

When the processing advances to step S46, a terminating marker is added after the encrypted code-block i. On the other hand, in step S47, a terminating marker is added before the encrypted code-block i.

The terminating marker will be described. In this embodiment, a terminating marker means a special marker which indicates the boundary between a codestream in a code-block and that outside the code-block. In, for example, the JPEG2000 standard, a code having a value of 0xFF90 or more is assigned to the terminating marker. The decoding (decompression) processing unit is designed, upon receiving a terminating marker, not to decode (decompress) the bitstream in the code-block after the terminating marker. That is, the terminating marker (terminating information) represents that data before it is significant data, and data after it is insignificant data. This information is used in this embodiment.

Figure 5:
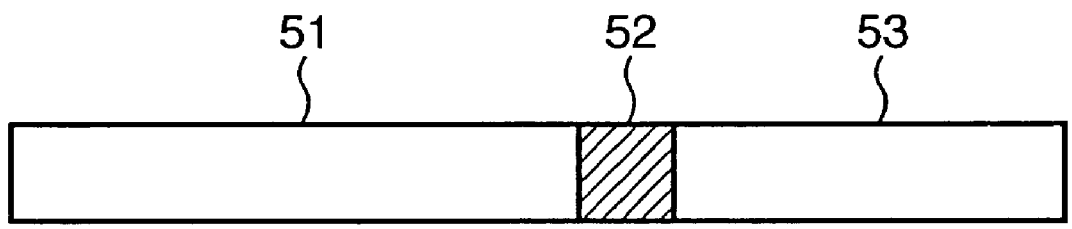
FIG. 5 is a view showing an example of the layout position of a terminating marker.

The terminating marker will be described in more detail with reference to FIG. 5. Referring to FIG. 5, reference numerals 51 and 53 denote bistreams; and 52, a terminating marker. In the state shown in FIG. 5, the decoding (decompression) processing unit (to be described later) decodes (decompresses) the bistream 51 as usual. Upon detecting the terminating marker 52, the decoding (decompression) processing unit does not decode (decompress) the subsequent bistream 53 in the same code-block.

The present invention uses such characteristic of the terminating marker. In the scrambling playback mode, the terminating marker is added after a cipher. In the non-scrambling playback mode, the terminating marker is added before a cipher. More specifically, in the scrambling playback mode, the cipher is located before the terminating marker and therefore played back in a scrambled state. In the non-scrambling playback mode, since the cipher is located after the terminating marker, it is not played back.

The terminating marker selection parameter "before" or "after" in the setting window 208 described in FIG. 20 represents this. In other words, the user selects the scrambling playback mode to non-scrambling playback mode in FIG. 20.

In this embodiment, only the terminating marker is added. However, the present invention is not limited to this, and various kinds of additional information may be added after the terminating marker. For example, information (an encrypted key or a pointer to a key) related to a key which decrypts a code-block or packet, various parameters (modes of operation in block cipher) for encryption, or information (an encryption algorithm name or information which specifies an encryption algorithm) related to an encryption algorithm may be added.

In this embodiment, to add a terminating marker (and additional information) in step S46 or S47, a terminating marker (and additional information) may newly be added or replace an encrypted or unencrypted bitstream. Examples of addition of a terminating marker will be described with reference to FIGS. 6A to 6F.

FIGS. 6A and 6B are views showing examples in which a terminating marker is added. FIGS. 6A and 6B show encrypted packet bodies. In the examples shown in FIGS. 6A and 6B, a packet is constituted by five code-blocks segmented by bold lines. Each shaded portion indicates a terminating marker. For these reasons, FIG. 6A shows the scrambling playback mode, and FIG. 6B shows the non-scrambling playback mode.

As shown in FIGS. 6A and 6B, when a terminating marker is added, the length of the code-block increases before or after encryption by an amount corresponding to the added terminating marker. For this reason, the length of each code-block recorded in the packet header or the length of the tile-part recorded in the tile-part header must be corrected to appropriate lengths.

FIGS. 6C and 6D show examples in which terminating markers are replaced. FIGS. 6C and 6D show encrypted packet bodies, as in FIGS. 6A and 6B. Even in the examples shown in FIGS. 6C and 6D, a packet is constituted by five code-blocks segmented by bold lines. Each shaded portion indicates a terminating marker. That is, FIG. 6C shows the scrambling playback mode, and FIG. 6D shows the non-scrambling playback mode.

As shown in FIGS. 6C and 6D, when the terminating marker is replaced, the length of each code-block does not change before or after encryption. Information of a bitstream before replacing the terminating marker is recorded in the tile-part header or packet header. Alternatively, the information may be transmitted from the encryption processing unit to the decryption processing unit as key information to restore the bitstream before replacing the terminating marker.

In this embodiment, when the scrambling mode is selected in step S45, the terminating marker is added after the encrypted code-block in step S46. However, this embodiment is not limited to this. In the scrambling mode, addition of the terminating marker may be omitted. In this case, information representing that the code-block or packet is encrypted is recorded in the main header, tile-part header, or packet header.

In this embodiment, as described above, additional information may be added after the terminating marker. Each of FIGS. 6E and 6F shows a structure in which additional information (indicated by a hatched portion) related to the packet is added after the terminating marker. FIG. 6E shows a packet structure in the scrambling mode, and FIG. 6F shows a packet structure in the non-scrambling mode. As shown in FIG. 6E, in the scrambling mode, the additional information related to the packet is added subsequent to the terminating marker only after the first code-block contained in the packet. On the other hand, as shown in FIG. 6F, in the non-scrambling mode, the additional information related to the packet is added subsequent to the terminating marker before the first code-block contained in the packet. In addition, only a terminating marker is added before each code-block except the first code-block. With the above structures, additional information related to the packet can efficiently be added (without adding the information to all code-blocks in the packet).

In step S48, the value of the parameter i is incremented by one. In step S49, the parameter i is compared to a value N. N is the total number of code-blocks contained in the packet. When i<N, the processing returns to step S43. When i≧N, the packet encryption processing is ended.

In this embodiment, information representing "whether a packet is encrypted" is recorded immediately after a terminating marker by using a code representing that the packet is encrypted. In this case, to cause the decryption processing unit (to be described later) to confirm whether the packet is encrypted, the packet structure must be interpreted to check the portion immediately after the terminating marker in the code-block. However, the present invention is not limited to this. The information representing that the packet is encrypted may be recorded not only immediately after the terminating marker but also in or outside the main header, tile-part header, or packet header. When this structure is employed, the decryption processing unit (to be described later) can check whether the packet is encrypted without interpreting the packet structure.

The encryption processing unit according to this embodiment has been described above.

<Decryption Processing Unit>

The decryption processing function according to this embodiment will be described next with reference to FIG. 8. This processing can simply be regarded as processing in the decoding (decompression) apparatus 142 shown in FIG. 14. Decoding (decompression) processing by JPEG2000 is located on the output side. Note that the arrangement shown in FIG. 8 indicates only the decryption processing function.

Figure 8:
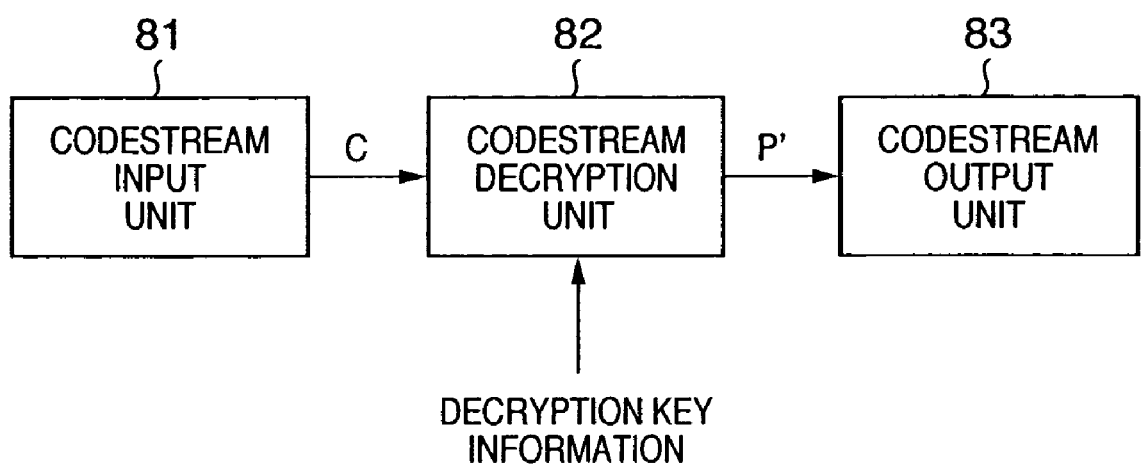
FIG. 8 is a block diagram showing the arrangement of a decryption processing unit according to the embodiment.

Referring to FIG. 8, reference numeral 81 denotes a codestream input unit; 82, a codestream decryption unit; and 83, a codestream output unit.

The codestream input unit 81 inputs a codestream and interprets a header contained in the codestream to extract parameters necessary for subsequent processing. The codestream input unit 81 controls the flow of processing or sends a necessary parameter to the following processing unit, as needed. Normally, the codestream C encrypted by the encryption processing unit shown in FIG. 1 described above is input. However, an unencrypted codestream may be input. The input codestream C is output to the codestream decryption unit 82.

The codestream decryption unit 82 receives the encrypted codestream C, decrypts a predetermined portion of the encrypted codestream C in accordance with decryption key information (if the key information is present), and outputs the decrypted codestream P'. When all ciphers in the encrypted codestream C are decrypted, the codestream P' equals the codestream P. However, not all ciphers are decrypted because of various conditions (to be described later) (for example, because no decryption key information is present, or scrambling playback is explicitly designated), the codestream P' does not equal the codestream P. The codestream decryption processing executed by the codestream decryption unit 82 will be described later in detail. The decrypted encrypted codestream P' is output to the codestream output unit 83.

The codestream output unit 83 receives the codestream P' decrypted by the codestream decryption unit 82 on the input side and outputs the decrypted codestream P'. The decrypted codestream P' is output to the decoding (decompression) processing unit (to be described later) to be played back as an image.

Figure 9:
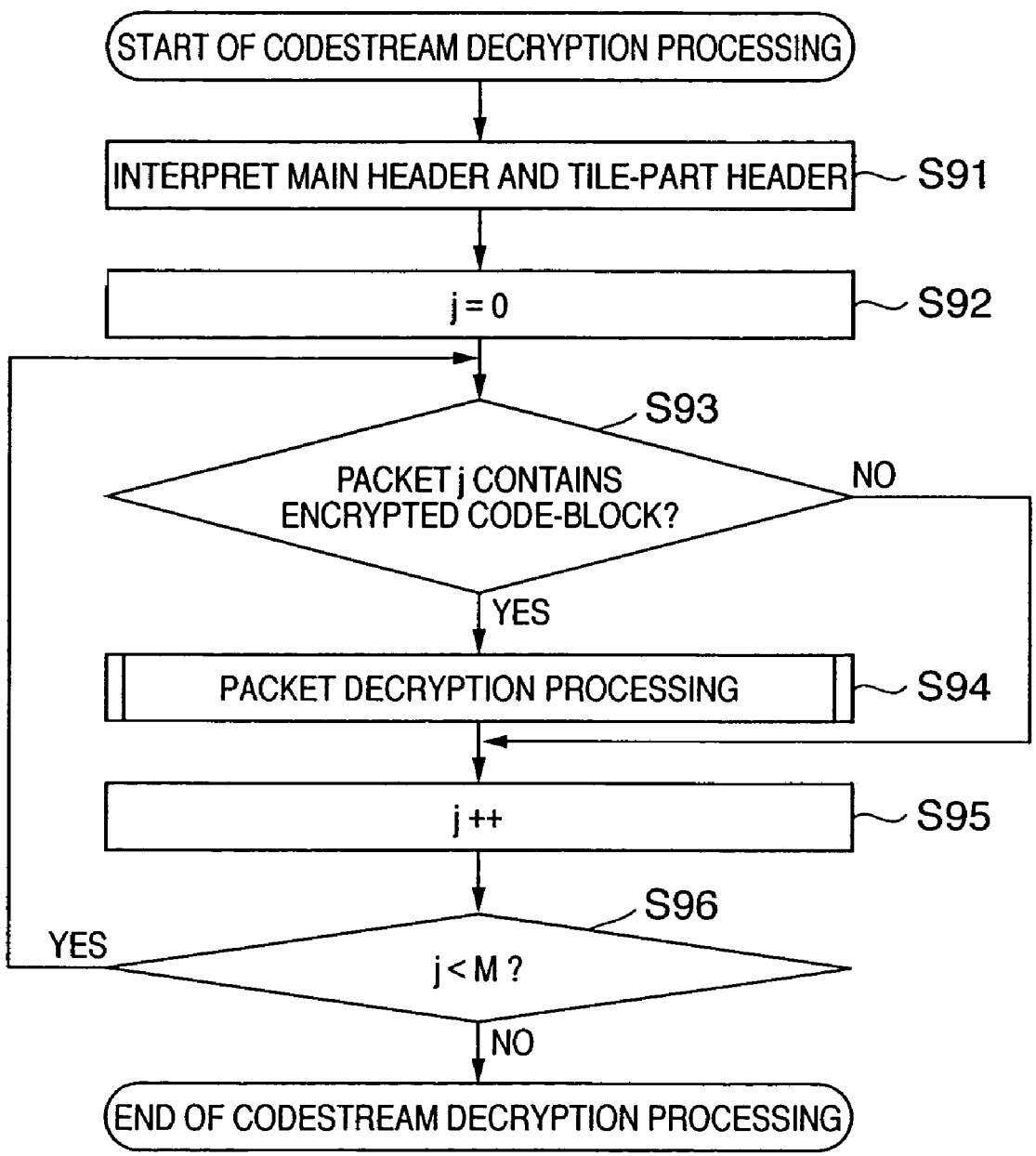
FIG. 9 is a flow chart showing the processing procedures of a codestream decryption unit in FIG. 8.

The codestream decryption processing executed by the codestream decryption processing unit 82 will be described next. FIG. 9 is a flow chart for explaining codestream decryption processing according to this embodiment.

In step S91, the main header and tile-part header of the input encrypted codestream C are interpreted. In step S92, the parameter j is initialized to zero. The parameter j specifies a packet. In step S93, it is determined whether an encrypted code-block is present in the specified packet j.

In this embodiment, information representing that the packet is encrypted or not encrypted is stored immediately after the terminating marker in the code-block that constitutes the packet. Hence, the determination is done by detecting the information. However, the determination may be done by checking information representing that the packet is encrypted in or outside the main header, tile-part header, or packet header. If such information is not used, the determination processing in step S93 may be skipped.

In step S94, the packet j is decoded (decompressed). The decoding (decompression) processing will be described later in detail. In step S95, the value of the parameter j is incremented by one. In step S96, the parameter j is compared to the value M. M is the total number of packets contained in the codestream. When j<M, the processing returns to step S93. When j≧M, the codestream decryption processing is ended.

The packet decoding (decompression) processing according to this embodiment will be described next in detail with reference to FIG. 10A. This processing is executed when an encrypted code-block is present in the packet of interest.

In step S101, the packet header of the input packet j is interpreted to interpret the structure of code-blocks contained in the packet. In step S102, the parameter i is initialized to zero. The parameter i specifies a code-block.

In step S103, it is determined whether the specified code-block i is encrypted. As described above, this determination is done on the basis of whether information representing that the code-block is encrypted is present immediately after the terminating marker. Instead, information that specifies an encrypted portion may be stored in the main header, tile-part header, or packet header, and determination may be done on the basis of this information.

If NO in step S103, the processing advances to step S107. The code-block of interest is output in the unprocessed state, the variable is incremented by one, and processing from step S103 (processing for the next code-block) is executed.

If YES in step S103, the processing advances to step S104 to determine whether key information that decrypts the encrypted code-block is present.

If NO in step S104, the processing advances to step S107 to send the code-block in the unprocessed state to the processing unit on the output side. When the terminating marker is present at the start of the code-block, the code-block is directly output to the output side. For the code-block after the terminating marker, for example, the code-block of interest, no encoded data decoding (decompression) processing is executed. Hence, non-scrambling playback is performed. When the terminating marker is present at the end of the code-block, the encoded (compressed) data in the encrypted state is decoded (decompressed). Hence, scrambling playback is performed (in this case, the terminating marker may be deleted).

If YES in step S104, the processing advances to step S106. In step S106, the encrypted code-block of interest is decrypted in accordance with the key information. When the terminating marker is present at the start of the code-block, the terminating marker is moved to the end of the code-block (or deleted). When information representing that the code-block is encrypted is recorded in the main header, tile-part header, or packet header, the information is changed such that it represents that the code-block is not encrypted.

Then, the processing advances to step S107 to output the decrypted code-block, and the variable i is updated.

The above processing is executed for all code-blocks contained in the packet of interest in step S108. When the processing is ended, the flow returns to step S95 in FIG. 9 to execute processing for the next packet.

The decryption processing unit according to this embodiment has been described above.

In the above processing, if no decryption key information is present, the terminating marker of a code-block that constitutes a packet is maintained as the input stream. In other words, the decoding (decompression) processing of encoded (compressed) image data is executed in a state wherein the intention of the user who has encrypted the data is reflected.

When decryption key information is present, the encrypted data is decrypted, and the terminating marker is moved to the end of the code-block or deleted so that playback processing using the code-block is performed.

<Encoding (Compression) Processing Unit>

In the above description, the apparatus 141 according to this embodiment encrypts an image file which has already been encoded (compressed) by JPEG2000. Instead, apparatus 141 may encodes (compresses) raw image data, and the arrangement shown in FIG. 1 may be prepared as subsequent processing.

Encoding (compression) in this arrangement will be described.

Encoding (compression) processing according to this embodiment will be described first with reference to FIG. 11.

Figure 11:
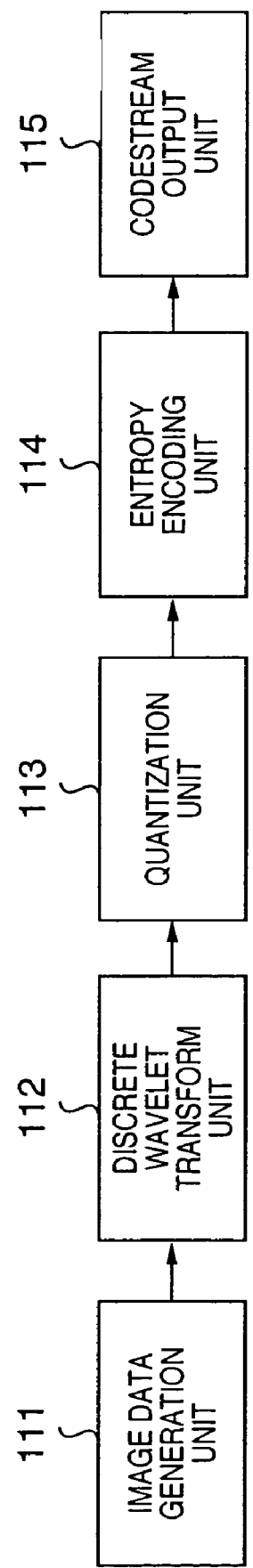
FIG. 11 is a block diagram showing the arrangement of image encoding (compression) processing according to the embodiment.

Referring to FIG. 11, reference numeral 111 denotes an image data generation unit; 112, a discrete wavelet transform unit; 113, a quantization unit; 114, an entropy encoding unit; and 115, a codestream output unit. Pixel signals which constitute an image to be encoded are input to the image data generation unit 111 in the order of raster scan. The output from the image data generation unit 111 is input to the discrete wavelet transform unit 112. For the descriptive convenience, the image signal in the following description expresses a monochrome multilevel image. If a plurality of color components of a color image are to be encoded, each of the RGB color components or luminance and chromaticity components is compressed as a monochrome component.

Figure 12A:
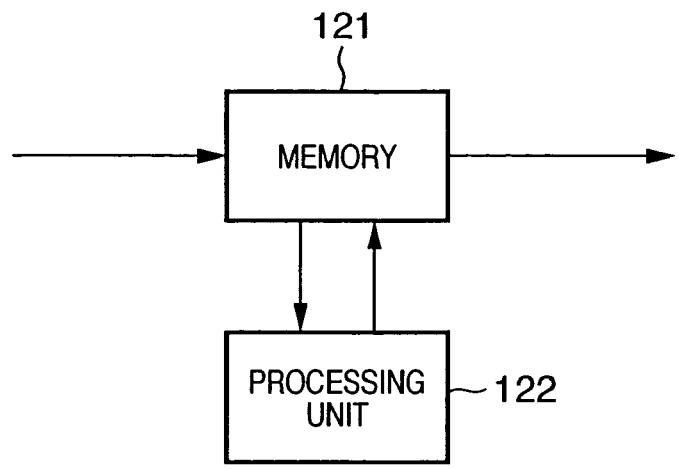
FIGS. 12A to 12C are views for explaining the arrangement and operation of a discrete wavelet transform unit in FIG. 11.
Figure 12B:
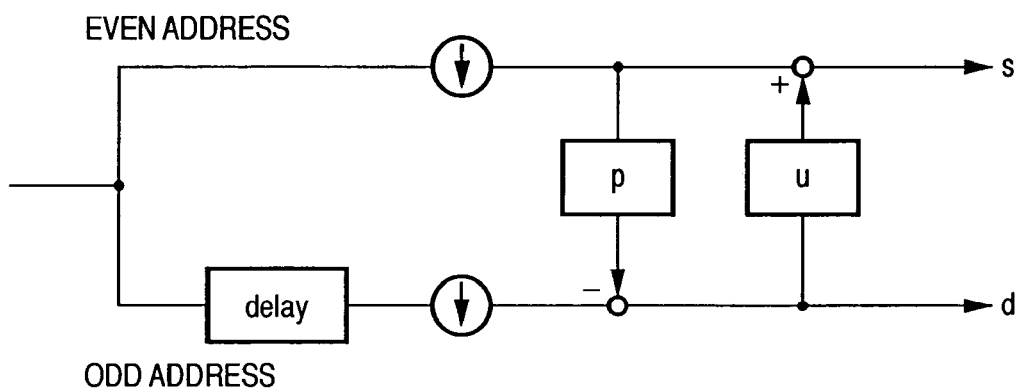

The discrete wavelet transform unit 112 performs two-dimensional discrete wavelet transform processing for the received image signal, calculates a transform coefficient, and outputs it. FIG. 12A shows the basic arrangement of the discrete wavelet transform unit 112. The input image signal is stored in a memory 121, sequentially read out and transformed by a processing unit 122, and written in the memory 121 again. In this embodiment, the processing unit 122 performs processing shown in FIG. 12B. Referring to FIG. 12B, the input image signal is separated into signals of even and odd addresses by a combination of a delay element and a down-sampler and subjected to filter processing by two filters p and u. Referring to FIG. 12B, s and d represent low- and high-pass coefficients which are obtained by segmenting a one-dimensional image signal by one level and given by $$d(n) = x(2*n+1) - \text{floor}((x(2*n) + x(2*n+2))/2) \quad (1)$$

$$s(n) = x(2*n) + \text{floor}((d(n-1) + d(n))/4) \quad (2)$$

where x(n) is the image signal to be transformed, and floor(x) is a function which returns a maximum integer which does not exceed x.

Figure 12C:
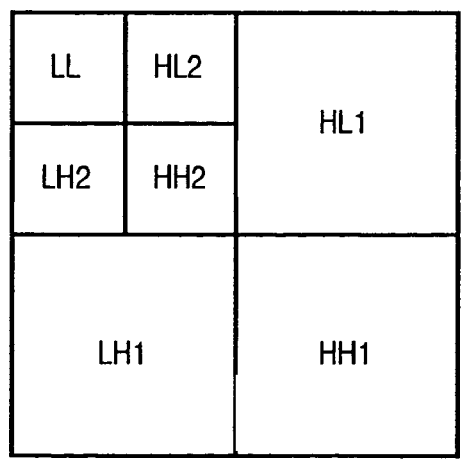

With the above processing, one-dimensional discrete wavelet transform processing for the image signal is performed. Two-dimensional discrete wavelet transform is performed by sequentially executing one-dimensional transform in the horizontal and vertical directions. Details of this processing are known, and a description thereof will be omitted. FIG. 12C shows an example of the structure of transform coefficients of two levels, which are obtained by two-dimensional transform processing. The image signal is segmented into coefficient sequences HH1, HL1, LH1, . . . , LL in different frequency bands. In the following description, a coefficient sequence will be referred to as a sub-band. A set of sub-bands belonging to the same segmentation level will be referred to as a resolution level. For example, HH1, HL1, and LH1 belong to the same resolution level. The coefficient of each sub-band is output to the following quantization unit 113.

The quantization unit 113 quantizes the received coefficient by a predetermined quantization step and outputs an index corresponding to the quantization value. Quantization is executed by $$q = \text{sign}(c)\text{floor}(abs(c)/\Delta) \quad (3)$$

$$\text{sign}(c) = 1; \ c >= 0 \quad (4)$$

$$\text{sign}(c) = -1; \ c < 0 \quad (5)$$

where c is a coefficient to be quantized.

In this embodiment, the value Δ includes 1. In this case, actual quantization is not executed. The transform coefficient input to the quantization unit 113 is output to the entropy encoding unit 114 without any processing.

The entropy encoding unit 114 segments the input sub-band into a plurality of rectangular regions which do not overlap each other. The quantization index contained in each segmented rectangular region is separated into bit planes. Binary arithmetic encoding is executed for each bit plane, and a codestream is output. The rectangular region as an encoding unit in the entropy encoding unit will be referred to as a code-block.

Figure 13:
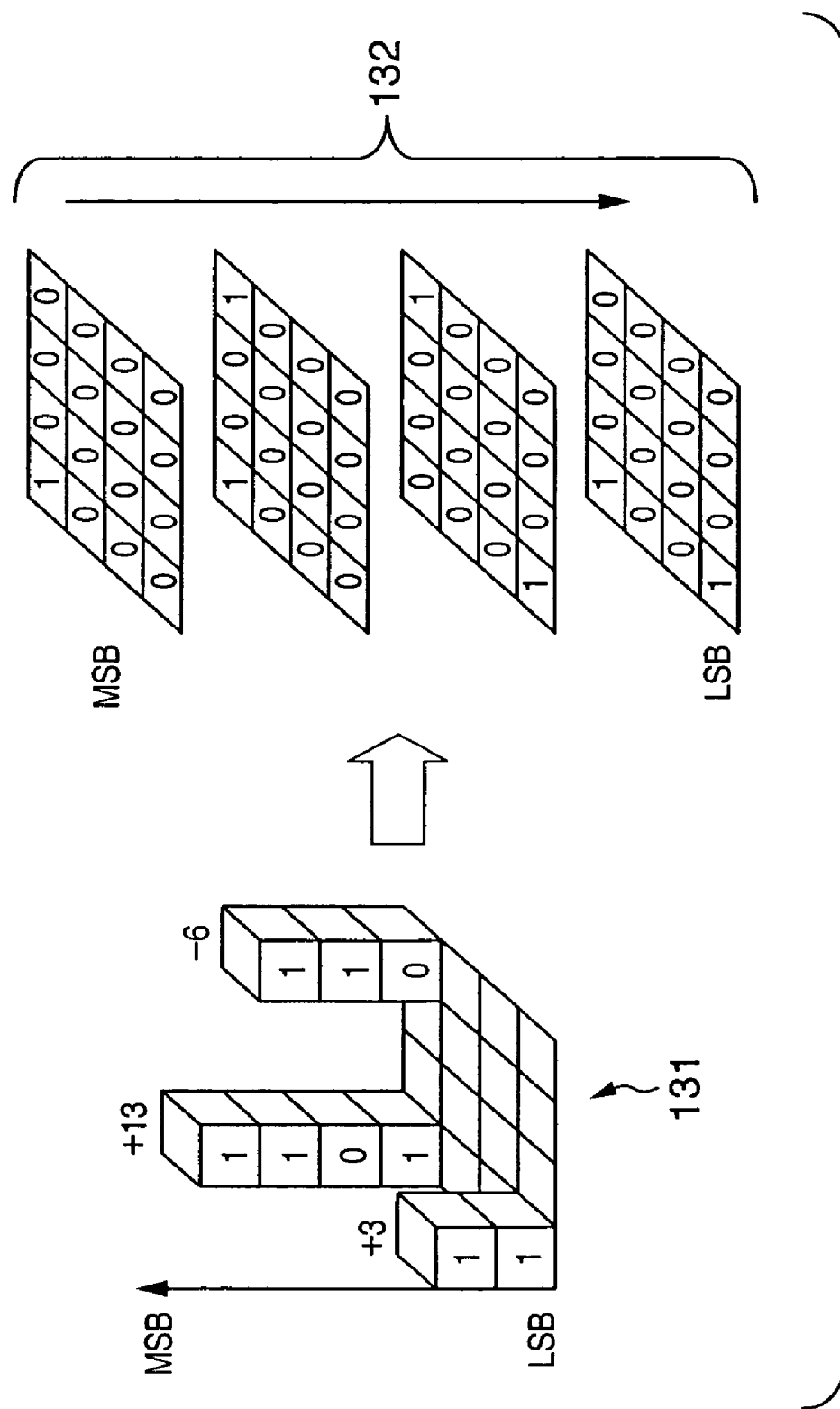
FIG. 13 is a view for explaining the processing contents of the entropy encoding unit in FIG. 11.

FIG. 13 is a view for explaining the operation of the entropy encoding unit 114. In this example, a code-block 131 having a size of 4×4 contains three non-zero quantization indices which have values of +13, −6, and +3, respectively. The entropy encoding unit 114 scans the code-block to obtain a maximum value MAX and calculates the number S of bits necessary for expressing the maximum quantization index by $$S = \text{ceil}(\log 2(abs(\text{MAX}))) \quad (6)$$

where ceil(x) is a function representing the smallest integral value of integers equal to or more than x.

In the code-block 131 shown in FIG. 13, since the maximum coefficient value is 13, S is 4. The 16 quantization indices in the sequence are processed for each of four bit planes, as indicated by 132 in FIG. 13. First, the entropy encoding unit 114 entropy-encodes (in this embodiment, binary-arithmetic-encodes) each bit of the most significant bit plane (MSB in FIG. 13) and outputs it as a bitstream. The level of bit plane is decreased by one. In the same way as described above, each bit in the bit plane is encoded (compressed) and output to the codestream output unit 115 until the target bit plane reaches the least significant bit plane (LSB in FIG. 13). In the above entropy encoding, in bit plane scanning from the upper to lower level, when a non-zero bit to be encoded (compressed) first (higher level) is detected, one bit representing the sign of the quantization index is added immediately after the non-zero bit, and binary arithmetic encoding (compression) is executed. With this processing, the signs of quantization indices other than zero can efficiently be encoded.

A processing unit formed by collecting a predetermined code amount of entropy codes entropy-encoded in the above-described manner will be called a layer. When a plurality of layers are formed, images corresponding to various code amounts can be played back at the time of decoding (decompression).

Note that the information of the most significant bit plane is dominant in each value. That is, in the above-described example, ON/OFF of encryption is set for each sub-band or frequency component group in wavelet transform. However, as described above, even when ON/OFF of encryption is set for each bit plane level, the same effect as described above can be expected. For example when encryption is performed for the least significant bit plane (bit 0), an image played back by decoding (decompression) up to the plane higher by one level (bit 1) can be reproduced at a resolution lower than the highest resolution at one level. This state is almost equivalent to that shown in FIGS. 7A to 7D.

<Decoding (Decompression) Processing Unit>

A method of decoding (decompressing) a codestream by the above-described encoding (compression) processing unit will be described next.

Figure 15:
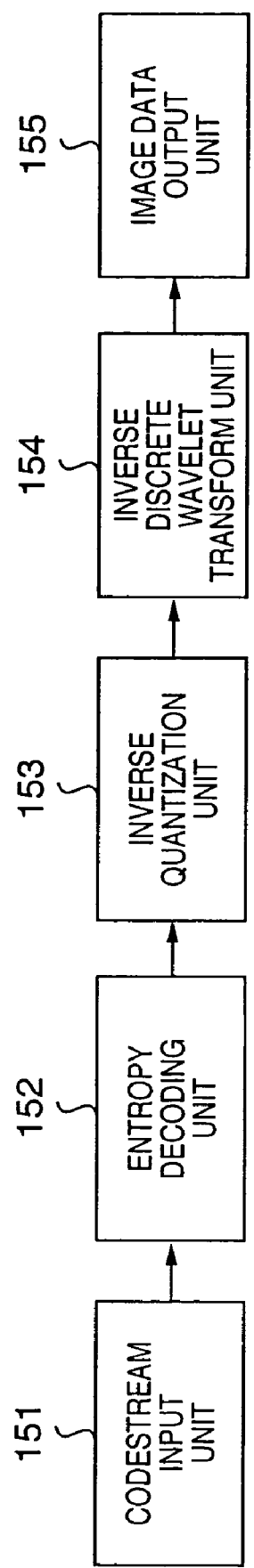
FIG. 15 is a block diagram showing the arrangement of encoded (compressed) data decoding (decompression) processing according to the embodiment.

FIG. 15 is a block diagram showing the arrangement of the decoding (decompression) processing unit according to this embodiment. Reference numeral 151 denotes a codestream input unit; 152, an entropy decoding unit; 153, an inverse quantization unit; 154, an inverse discrete wavelet transform unit; and 155, an image output unit.

The codestream input unit 151 inputs a codestream and interprets a header contained in the codestream to extract parameters necessary for subsequent processing. The codestream input unit 151 controls the flow of processing or sends a necessary parameter to the following processing unit, as needed. To put it plainly, the output from the codestream output unit 83 shown in FIG. 8 is input. The bistream contained in the codestream is output to the entropy decoding unit 152.

Figure 16:
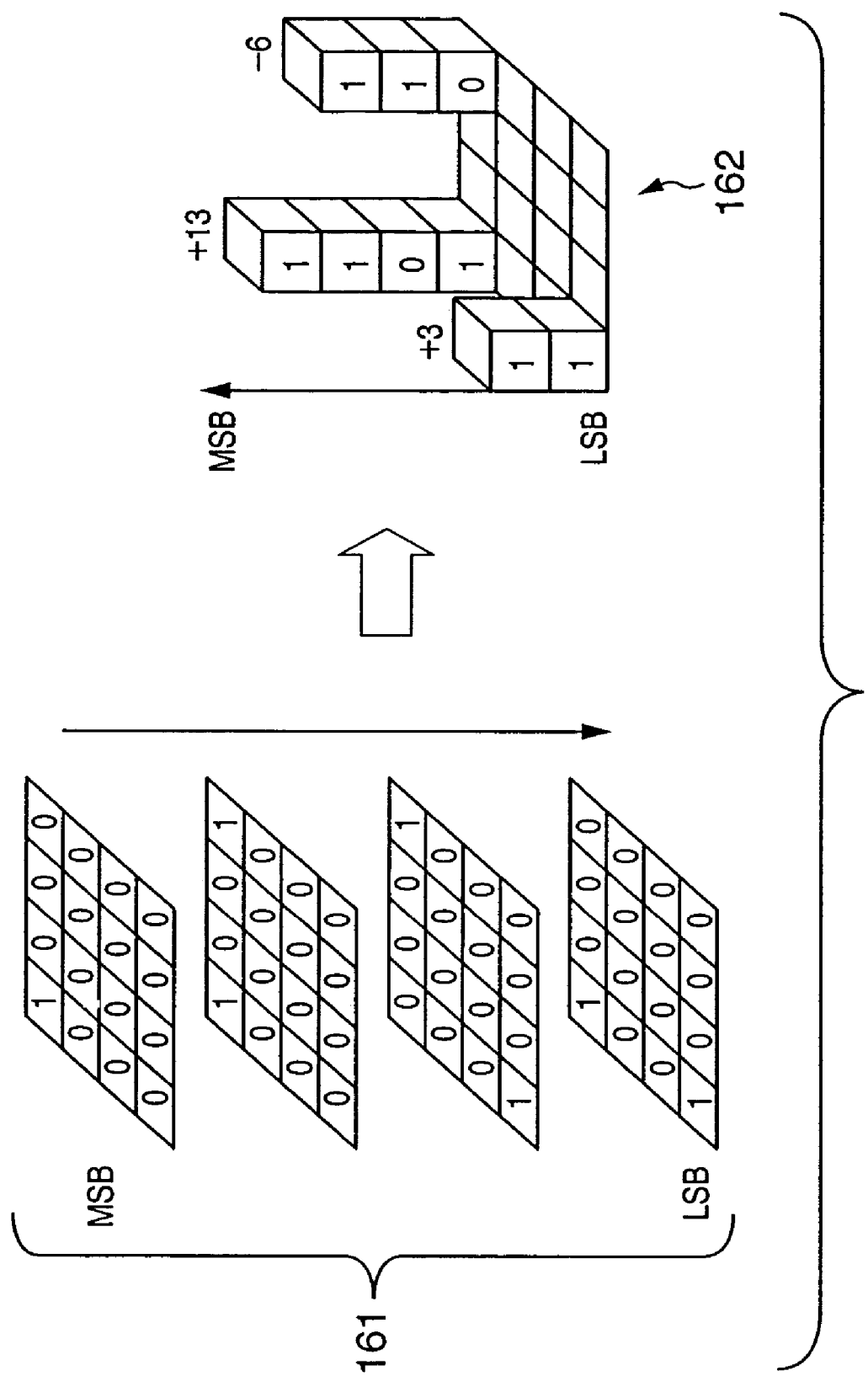
FIG. 16 is a view for explaining the processing contents of the entropy decoding unit in FIG. 15.

The entropy decoding unit 152 divides the bistream into code-blocks, decodes (decompresses) each bit plane in the code-block, and outputs the decoded (decompressed) data. FIG. 16 shows the decoding (decompression) procedures at this time. Referring to FIG. 16, a code-block 161 to be decoded (decompressed) is sequentially decoded (decompressed) for each bit plane and finally restored to a quantization index 162. The arrow in FIG. 16 indicates the order to decoding (decompression) of bit planes. The restored quantization index is output to the inverse quantization unit 153.

The inverse quantization unit 153 restores the discrete wavelet transform coefficient from the received quantization index on the basis of $$c' = \Delta * q; \quad q \neq 0 \quad (7)$$

$$c' = 0; \quad q = 0 \quad (8)$$

where q is a quantization index, $\Delta$ is the quantization step which is the same value as that used in encoding (compression), and c' is the restored transform coefficient of the coefficient s or d in encoding (compression). The transform coefficient c' is output to the following inverse discrete wavelet transform unit 154.

Figure 17A:
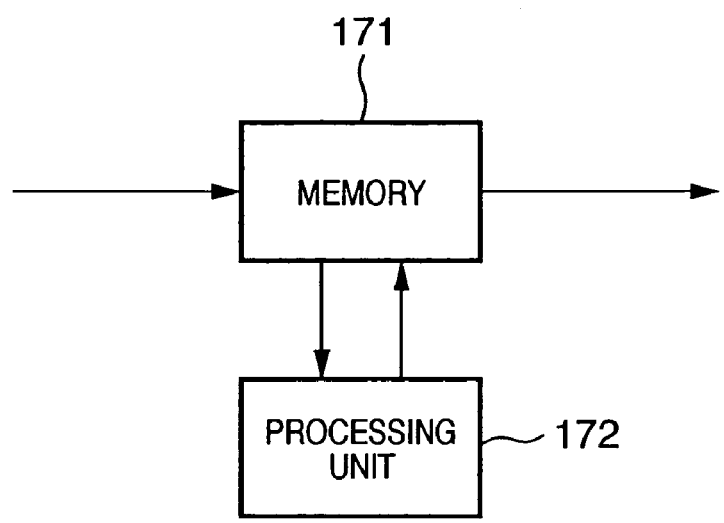
FIGS. 17A and 17B are block diagrams for explaining the arrangement and operation of an inverse discrete wavelet transform unit in FIG. 15.
Figure 17B:
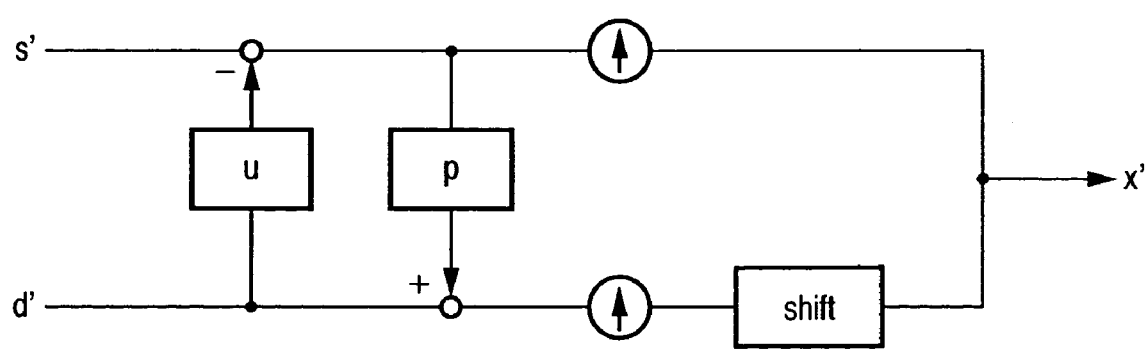

FIGS. 17A and 17B are block diagrams of the arrangement and processing of the inverse discrete wavelet transform unit 154. Referring to FIG. 17A, the input transform coefficient is stored in a memory 171. A processing unit 172 performs one-dimensional inverse discrete wavelet transform. The transform coefficients are sequentially read out from the memory 171 and processed to execute two-dimensional inverse discrete wavelet transform. The two-dimensional inverse discrete wavelet transform is executed in accordance with procedures in an order reverse to that of forward transform. Details of this processing are known, and a description thereof will be omitted. FIG. 17B shows the processing block of the processing unit 172. The input transform coefficients are subjected to filter processing by the two filters u and p, up-sampled, and superposed so that an image signal x' is output this processing is executed by $$x'(2*n) = s'(n) - \text{floor}((d'(n-1) + d'(n))/4) \quad (9)$$

$$x'(2*n+1) = d'(n) + \text{floor}((x'(2*n) + x'(2*n+2))/2) \quad (10)$$

The discrete wavelet transform in the forward and reverse directions by equations (1), (2), (9), and (10) satisfies complete reconstruction conditions. In this embodiment, when the quantization step $\Delta$ is 1, and all bit planes are decoded (decompressed) by bit plane decoding (decompression), the decoded (decompressed) image signal x' coincides with the original image signal x.

With the above processing, the image is restored and output to the image output unit 155. The image output unit 155 can be either an image display apparatus such as a monitor or a storage device such as a magnetic disk.

Modification to First Embodiment

In the above embodiment, for example, assume that data in which {LH3+HH3+HL3} is encrypted, and the remaining resolution levels are not encrypted is received and played back by the apparatus 142, as shown in FIG. 7A. When the apparatus 142 has no decryption key information, the data corresponding to the highest resolution is played back in the encrypted state. As a result, a scrambled image as shown in FIG. 7B is displayed.

However, the user of the apparatus 141 on the encrypting side permits playback of data up to {LH2+HH2+HL2}, which is, the resolution lower than the highest resolution by one level. Hence, even if the user of the apparatus 142 has no decryption key information, the image is preferably played back in a state immediately before using the data of {LH3+HH3+HL3}, as needed.

The modification to the first embodiment solves this problem.

Figure 10A:
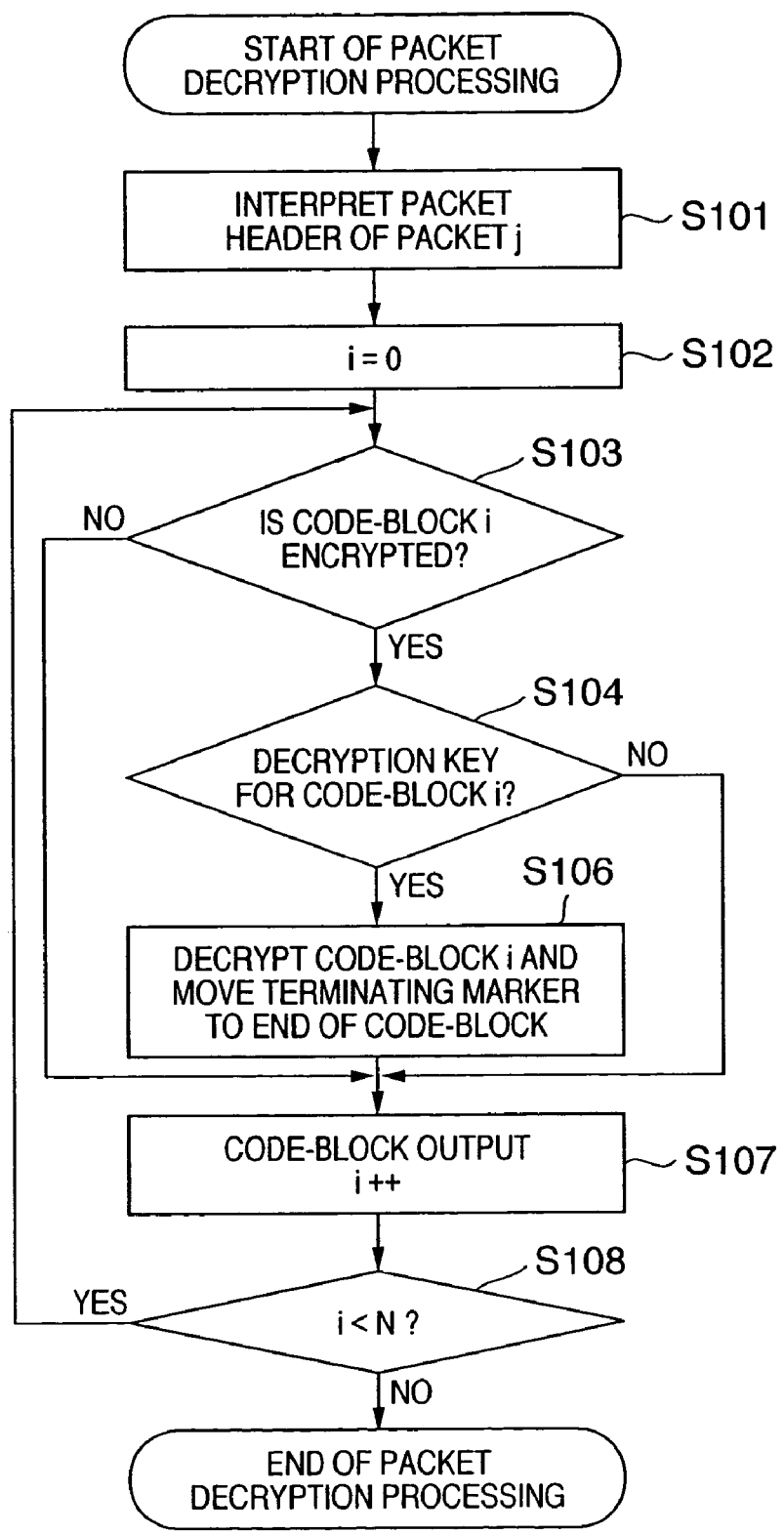
FIG. 10A is a flow chart showing details of the processing procedures of packet decryption processing in FIG. 9.

FIG. 10B replaces FIG. 10A described above. The remaining apparatus components are the same as in the first embodiment. FIG. 10B will be described below.

FIG. 10B is different from FIG. 10A in that steps S105, S109 and S110 are added. These steps will sequentially be described below. Before the start of the following processing, assume that the user of the apparatus 142 sets whether scrambling is to be canceled. This setting may appropriately be done at the time of decryption. Alternatively, the set items of the user may be stored and held in a file. In the former case, setting can be executed in playing back individual images. In the latter case, if the set contents are not particularly changed, they are reflected on all image decryption processing operations.

In step S101, the packet header of the input packet j is interpreted to interpret the structure of code-blocks contained in the packet. In step S102, the parameter i is initialized to zero. The parameter i specifies a code-block.

In step S103, it is determined whether the specified code-block i is encrypted. As described above, this determination is done on the basis of whether information representing that the code-block is encrypted is present immediately after the terminating marker. Instead, information that specifies an encrypted portion may be stored in the main header, tile-part header, or packet header, and determination may be done on the basis of this information.

If NO in step S103, the processing advances to step S107. The code-block of interest is output in the unprocessed state, the variable is incremented by one, and processing from step S103 (processing for the next code-block) is executed.

If YES in step S103, the processing advances to step S104 to determine whether key information that decrypts the encrypted code-block is present.

If NO in step S104, the processing branches to step S109. If YES in step S104, the processing advances to step S105.

In step S105, it is determined whether a predetermined code-block is to be played back in the scrambling mode or non-scrambling mode. As described above, this determination is done on the basis of the set contents by the user of the apparatus 142. Normally, when a decryption key is present, the code-block is played back in the non-scrambling mode. However, when part of an encrypted codestream should be decoded (decompressed) and decrypted, and part of the encrypted codestream should not be decoded (decompressed) and decrypted, the scrambling playback mode can explicitly be selected in step S105. When all ciphers having a decryption key should be decoded (decompressed) and decrypted, step S105 can be omitted.

In step S106, the code-block i is decrypted. The decryption processing must correspond to the encryption algorithm used in step S44 in FIG. 4 described above. The encryption algorithm used in step S44 can be known by checking information recorded in the main header, tile-part header, or packet header. Alternatively, additional information added after the terminating marker described above may be checked. The terminating marker in the decrypted code-block is located to the end of the code-block or deleted. When information representing that the code-block is encrypted is recorded in the main header, tile-part header, or packet header, the information is changed such that it represents that the code-block is not encrypted.

If NO in step S104, the processing advances to step S109. In step S109, it is determined whether non-scrambling playback mode is to be used when no decryption key is present. This determination is done as in step S105. The user may explicitly designate, or determination may be done by using information stored in a RAM or HDD in advance. If YES in step S109, the flow advances to step S110. If NO in step S109, the flow advances to step S107. In step S110, when the terminating marker is added before the cipher, the terminating marker is moved to the end of the cipher. Alternatively, the terminating marker may be erased.

The processing in steps S109 and S110 will be described. In the non-scrambling playback mode, the above-described encryption processing unit adds a terminating marker before the cipher in the code-block i. Since the cipher is not decoded (decompressed) because of the terminating marker, the non-scrambling playback mode is normally set. According to this embodiment, however, scrambling playback or non-scrambling playback can be selected in the determination processing in step S109.

When the processing advances to step S107, the code-block is output, and the variable i is incremented. In step S108, it is determined whether the processing has been executed for all code-blocks contained in the packet of interest. If NO in step S108, the processing from step S103 is repeated. If YES in step S108, the flow returns to step S95 in FIG. 9 to execute processing for the next packet.

As a consequence, according to this modification, even when no decryption key information is present, non-scrambling playback at the highest resolution level permitted by the user who has encrypted the data can be performed. For this reason, the highest image quality at least in the allowable range can be browsed, although the image cannot be the original image.

In the above example, whether the data is encrypted is determined by adding information representing whether the data is encrypted immediately after the terminating marker and identifying the information. In JPEG2000, normally, the terminating marker is rarely used. Hence, the determination may be done on the basis of whether the terminating marker is present. In this case, when the terminating marker is present, it can be regarded that the data is encrypted, and the non-scrambling playback mode is set.

Second Embodiment

In the above-described embodiment (first embodiment and its modification), as shown in FIG. 4, encryption is executed for each code-block. However, the present invention is not limited to this. Encryption may be executed for each logic unit or hierarchical structure of an input codestream.

As a logic unit, a packet, tile-part, codestream, or a combination thereof can be adapted. As a hierarchical structure, resolution level, layer, precinct, component, or a combination thereof can be adapted. When encryption is done for each hierarchical structure, information which specifies "which hierarchical structure is encrypted" is recorded in the main header, tile-part header, or packet header.

Even when encryption is executed for each logic unit or hierarchical structure, the non-scrambling playback mode can be set by adding a terminating marker before the cipher in each of all code-blocks contained in the encrypted logic unit or hierarchical structure, as in the first embodiment.

As described above, when encryption is executed for each logic unit or hierarchical structure, the encrypted logic unit or hierarchical structure is specified, and the specified logic unit or hierarchical structure is decrypted.

Third Embodiment

In the first and second embodiments, as shown in FIG. 1, a codestream input to the encryption processing unit has already been encoded (compressed). In this arrangement, execution of encoding (compression) processing and execution of encryption processing are regarded as independent processing. After encoding (compression) processing is executed, encryption processing is executed. That is, this arrangement is convenient in executing encoding (compression) by an existing application and separately executing encryption processing.

Similarly, as shown in FIG. 8, output from the decryption processing unit is also a codestream. This arrangement is convenient in independently executing the decryption processing and the decoding (decompression) processing and executing decoding (decompression) processing by an existing application.

However, the present invention is not limited to this. The encoding (compression) processing and encryption processing may be executed as the same application. Alternatively, the encryption processing and decoding (decompression) processing may be executed as the same application.

The arrangement of encoding (compression) processing and encryption processing unit according to this embodiment will be described first with reference to FIG. 18.

Referring to FIG. 18, reference numeral 181 denotes an image generation unit (a unit which receives image data from a device such as a CCD scanner or digital camera); 182, a discrete wavelet transform unit; 183, a quantization unit; 184, an entropy encoding unit; 185, an encryption unit; and 186, a codestream output unit.

The operations of the image generation unit 181, discrete wavelet transform unit 182, quantization unit 183, entropy encoding unit 184, and codestream output unit 186 are the same as those of the image data generation unit 111, discrete wavelet transform unit 112, quantization unit 113, entropy encoding unit 114, and codestream output unit 115 shown in FIG. 11 described above, respectively, and a detailed description thereof will be omitted. The number of tiles to be wavelet-transformed, the number of times of transform, and the quantization step in the quantization unit are processed in accordance with user's settings.

In this embodiment, a bistream is entropy-decoded by the entropy encoding unit 184 and then encrypted by the encryption unit 185. As described in the second embodiment, as the object of encryption processing, a bistream corresponding to a logic unit or hierarchical structure can be selected. The non-scrambling playback mode can be set by adding a terminating marker before the cipher in each of all code-blocks contained in the encrypted logic unit or hierarchical structure.

In this embodiment, the encryption unit 185 follows the entropy encoding unit 184. In this arrangement, the encryption unit 185 encrypts an entropy-decoded bistream. However, the present invention is not limited to this. The encryption unit 185 may follow the quantization unit 183, discrete wavelet transform unit 182, or image generation unit 181.

When the encryption unit 185 follows the quantization unit 183, a quantization index (or a bitstream constituting the quantization index) is encrypted. When the encryption unit 185 follows the discrete wavelet transform unit 182, a discrete wavelet transform coefficient (or a bitstream constituting the discrete wavelet transform coefficient) is encrypted. When the encryption unit 185 follows the image generation unit 181, a pixel (or a bitstream constituting the pixel) is encrypted.

In the above processing, raw image data (uncompressed image data) is designated. Hence, an uncompressed image (e.g., an image having an extension BMP) can be selected as a file to be encrypted. In this case, the GUI has, for example, a structure shown in FIG. 21. In JPEG2000, a plurality of tiles can be set for one image. Hence, the window shown in FIG. 21 has a tile count setting input field □×□(1×1=1 image 1 tile in default). In addition, the user can designate the number of times of wavelet transform.

In the example shown in FIG. 21, the number of tiles to set to 2×2. Tiles are selected first, and then, an object to be encrypted is set, as in the first embodiment. The tile itself can also be compressed. In a setting window 208, encryption of a whole tile (one of 2×2 tiles) can also be set. Hence, encryption can also be set for a desired resolution level at a desired position in the original image.

The arrangement of the decryption processing unit according to this embodiment will be described next with reference to FIG. 19.

Referring to FIG. 19, reference numeral 191 denotes a codestream input unit; 192, a decryption unit; 193, an entropy decoding unit; 194, an inverse quantization unit; 195, an inverse discrete wavelet transform unit; and 196, an image data output unit.

The operations of the codestream input unit 191, entropy decoding unit 193, inverse quantization unit 194, inverse discrete wavelet transform unit 195, and image data output unit 196 are the same as those of the codestream input unit 151, entropy decoding unit 152, inverse quantization unit 153, inverse discrete wavelet transform unit 154, and image output unit 155 shown in FIG. 15 described above, respectively, and a detailed description thereof will be omitted.

In this embodiment, a bistream input to the codestream input unit 191 is decrypted by the decryption unit 192. As described in the second embodiment, the object of decryption processing is a bistream corresponding to a logic unit or hierarchical structure.

In this embodiment, the decryption unit 192 follows the codestream input unit 191. In this arrangement, the decryption unit 192 decrypts an input encrypted bistream. However, the present invention is not limited to this. The decryption unit 192 may follow the entropy decoding unit 193, inverse quantization unit 194, or inverse discrete wavelet transform unit 195.

When the decryption unit 192 follows the entropy decoding unit 193, an encrypted quantization index (or a bitstream constituting the quantization index) is decrypted. When the decryption unit 192 follows the inverse quantization unit 194, an encrypted discrete wavelet transform coefficient (or a bitstream constituting the discrete wavelet transform coefficient) is decrypted. When the decryption unit 192 follows the inverse discrete wavelet transform unit 195, an encrypted pixel (or a bitstream constituting the pixel) is decrypted.

The embodiments according to the present invention have been described above. In the embodiments, JPEG2000 has been described as an example. However, the present invention is not limited to this and can also be applied to image data having a terminating marker described in the above embodiments, or terminating information having equivalent meaning. From the viewpoint of transmission efficiency, the object to be encrypted is preferably data which is encoded (compressed) and has a hierarchical structure or similar encoding (compression) data (e.g., JPEG). However, this is merely a preferable example and not essential.

As is apparent from the description of the embodiments, the apparatuses 141 and 142 can be implemented by a program which runs on a general-purpose information processing apparatus such as a personal computer. Hence, the present invention also incorporates the computer program. In addition, normally, the computer program is recorded in a computer-readable storage medium such as a CD-ROM. When the storage medium is set in the computer, and the program is copied or installed in the system, the program can be executed. The present invention also incorporates the computer-readable storage medium.

As has been described above, according to the present invention, whether image data should be played back in a scrambled state or non-scrambled state by the image playback apparatus can be set on the encryption side.

As many apparently widely different embodiments of the present invention can be made without departing from the spirit and scope thereof, it is to be understood that the invention is not limited to the specific embodiments thereof except as defined in the appended claims.

What is claimed is:

1. An image data encryption method of encrypting encoded image data which is constituted by a plurality of encoded data blocks, comprising:

a step of inputting one of the plurality of encoded data blocks;

a determination step of determining whether the data block inputted in said inputting step is an object to be encrypted;

an encryption step of encrypting the data block when it is determined in the determination step that the data block as-is the object to be encrypted;

a discrimination step of discriminating whether the data block is an object to be reproduced at a decoder in a scrambling mode or in a non-scrambling mode; and an addition step of adding terminating information to a starting position of the data block encrypted in the encryption step if it is discriminated in the discrimination step that the data block is an object to be reproduced in the non-scrambling mode, and adding the terminating information to an ending position of the data block encrypted in the encryption step if it is discriminated in the discrimination step that the data block is an object to be reproduced in the scrambling mode, wherein the terminating information is used to notify the decoder to not perform decoding for the subsequent data to the end of the data block.

2. The method according to claim 1, wherein said addition step includes a step of adding information representing whether the data block has been encrypted after the terminating information.

3. The method according to claim 1, wherein, in the terminating information addition step, the terminating information is replaced with the encrypted image data.

4. The method according to claim 1, further comprising an encoding step of encoding (compressing) image data,
wherein in the input step, encoded (compressed) image data is input.

5. The method according to claim 4, wherein the encoding step comprises
a frequency conversion step of converting data in a spatial domain into data in a frequency domain,
a quantization step of quantizing the data in the frequency domain and calculating a quantization index, and
an entropy encoding step of entropy-encoding the quantization index.

6. The method according to claim 5, wherein the entropy encoding step comprises
a region division step of dividing a predetermined frequency region into a plurality of rectangular regions which do not overlap each other,
an entropy encoding step of entropy-encoding the quantization index for each bit plane in each rectangular region, and
an entropy codestream division step of dividing an entropy codestream in the rectangular region into at least a set of codestreams.

7. The method according to claim 6, wherein, in the addition step, the terminating information is added to each set of codestreams in the rectangular region.

8. The method according to claim 4, wherein the encoding step comprises
a frequency conversion step of converting data in a spatial domain into data in a frequency domain,
a quantization step of quantizing the data in the frequency domain and calculating a quantization index, and
an entropy encoding step of entropy-encoding the quantization index, and
in the encryption step, encryption processing is executed for the entropy-encoded entropy codestream.

9. The method according to claim 4, wherein the encoding step comprises
a frequency conversion step of converting data in a spatial domain into data in a frequency domain,
a quantization step of quantizing the data in the frequency domain and calculating a quantization index, and
an entropy encoding step of entropy-encoding the quantization index, and
in the encryption step, encryption processing is executed for the quantized quantization index.

10. The method according to claim 4, wherein the encoding step comprises
a frequency conversion step of converting data in a spatial domain into data in a frequency domain,
a quantization step of quantizing the data in the frequency domain and calculating a quantization index, and
an entropy encoding step of entropy-encoding the quantization index, and
in the encryption step, encryption processing is executed for the frequency-converted data in the frequency domain.

11. The method according to claim 8, wherein the entropy encoding step comprises
a region division step of dividing a predetermined frequency region into a plurality of rectangular regions which do not overlap each other,
an entropy encoding step of executing entropy-encoding for each bit plane in each rectangular region to generate an entropy codestream, and
an entropy codestream division step of dividing an entropy codestream in the rectangular region into at least a set of codestreams.

12. The method according to claim 11, wherein, in the addition step, the terminating information is added to each set of codestreams in the rectangular region.

13. An image data encryption apparatus for encrypting encoded image data which is constituted by a plurality of encoded data blocks, comprising:
input means for inputting one of the plurality of encoded data blocks;
determination means for determining whether the data block inputted by said input means is an object to be encrypted;
encryption means for encrypting the data block when said determination means determines that the data block is the object to be encrypted;
discrimination means for discriminating whether the data block is an object to be reproduced at a decoder in a scrambling mode or in a non-scrambling mode; and
addition means for adding terminating information to a starting position of the data block encrypted by said encryption means if it is discriminated by said discrimination means that the data block is an object to be reproduced in the non-scrambling mode, and adding the terminating information to an ending position of the data block encrypted by said encryption means if it is discriminated by said discrimination means that the data block is an object to be reproduced in the scrambling mode, wherein the terminating information is used to notify the decoder to not perform decoding for the subsequent data to the end of the data block.

14. A computer-readable storage medium embodying a computer program for causing an apparatus to function which functions as an image data encryption apparatus for encrypting image data which is constituted by a plurality of encoded data blocks, characterized by functioning as:
input means for inputting one of the plurality of encoded data blocks;
determination means for determining whether the data block inputted by said input means is an object to be encrypted;
encryption means for encrypting the data block when said determination means determines that the data block is the object to be encrypted;
discrimination means for discriminating whether the data block is an object to be reproduced at a decoder in a scrambling mode or in a non-scrambling mode; and
addition means for adding terminating information to a starting position of the data block encrypted by said encryption means if it is discriminated by said discrimination means that the data block is an object to be reproduced in the non-scrambling mode, and adding the terminating information to an ending position of the data block encrypted by said encryption means if it is discriminated by said discrimination means that the data block is an object to be reproduced in the scrambling mode, wherein the terminating information is used to notify the decoder to not perform decoding for the subsequent data to the end of the data block.

* * * * *

UNITED STATES PATENT AND TRADEMARK OFFICE
CERTIFICATE OF CORRECTION

PATENT NO. : 7,362,860 B2
APPLICATION NO. : 10/789986
DATED : April 22, 2008
INVENTOR(S) : Junichi Hayashi It is certified that error appears in the above-identified patent and that said Letters Patent is hereby corrected as shown below:

Col. 4, line 14, after "image" insert --is input--.

Col. 4, line 35, "two" should read --from two--.

Col. 7, line 7, "eter J" should read --eter j--.

Col. 9, line 7, "bistreams;" should read --bitstreams;--.

line 10, "bistream" should read --bitstream--.

line 13, "bistream" should read --bitstream--.

Col. 12, line 65, "encodes (compresses)" should read --encode (compress)--.

Col. 15, line 14, "bistream" should read --bitstream--.

line 16, "bistream" should read --bitstream--.

line 55, "output this" should read --output. This--.

Col. 18, line 64, "bistream" should read --bitstream--.

line 67, "bistream" should read --bitstream--.

Col. 19, line 8, "bistream." should read --bitstream.--.

line 30, after "tiles" insert --is--.

Col. 19, line 53, "bistream" should read --bitstream--.

line 56, "bistream" should read --bitstream--.

line 60, "bistream." should read --bitstream.--.

UNITED STATES PATENT AND TRADEMARK OFFICE
CERTIFICATE OF CORRECTION

PATENT NO. : 7,362,860 B2
APPLICATION NO. : 10/789986
DATED : April 22, 2008
INVENTOR(S) : Junichi Hayashi It is certified that error appears in the above-identified patent and that said Letters Patent is hereby corrected as shown below:

Col. 20, line 51, "as-is" should read --is--.

Signed and Sealed this

Third Day of February, 2009

JOHN DOLL
*Acting Director of the United States Patent and Trademark Office*